(12) United States Patent
Liu

(10) Patent No.: US 12,526,432 B2
(45) Date of Patent: Jan. 13, 2026

(54) INFORMATION TRANSMISSION METHOD AND APPARATUS, TERMINAL, AND NETWORK-SIDE DEVICE

(71) Applicant: VIVO MOBILE COMMUNICATION CO., LTD., Guangdong (CN)

(72) Inventor: Jinhua Liu, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 50 days.

(21) Appl. No.: 18/672,634

(22) Filed: May 23, 2024

(65) Prior Publication Data

US 2024/0323399 A1    Sep. 26, 2024

Related U.S. Application Data

(63) Continuation of application No. PCT/CN2022/135867, filed on Dec. 1, 2022.

(30) Foreign Application Priority Data

Dec. 3, 2021 (CN) .......................... 202111467958.8

(51) Int. Cl.
*H04N 19/159* (2014.01)
*H04L 47/56* (2022.01)
(Continued)

(52) U.S. Cl.
CPC .......... *H04N 19/159* (2014.11); *H04L 47/56* (2013.01); *H04N 19/172* (2014.11);
(Continued)

(58) Field of Classification Search
CPC .. H04N 19/159; H04N 19/172; H04N 19/177; H04L 47/56; H04W 28/0205; H04W 28/0908
(Continued)

(56) References Cited

U.S. PATENT DOCUMENTS

2008/0019398 A1* 1/2008 Genossar ............. H04N 21/434
                                                    348/E5.005
2011/0075579 A1* 3/2011 Seymour ................. H04W 8/04
                                                    370/252
(Continued)

FOREIGN PATENT DOCUMENTS

CN          106304377 A         1/2017
CN          113286326 A         8/2021
(Continued)

OTHER PUBLICATIONS

Qualcomm Europe, S.A.R.L. APTO-ARR Signaling for MTSI Video Dynamic Rate Adaptation. SA#50 Meeting. S4-080484. Online. Aug. 2008. 3 pages.
(Continued)

*Primary Examiner* — Marnie A Matt
(74) *Attorney, Agent, or Firm* — Foley & Lardner LLP

(57) ABSTRACT

An information transmission method and apparatus, a terminal, and a network-side device. The information transmission method in embodiments of this application includes: obtaining, by a terminal, arrival time advance information, where the arrival time advance information includes an arrival time advance of a target picture frame, and the arrival time advance is an advance of an actual arrival time of the target picture frame relative to a target arrival time; and sending, by the terminal, the arrival time advance information to a network-side device.

20 Claims, 12 Drawing Sheets

(51) Int. Cl.
  *H04N 19/172*  (2014.01)
  *H04N 19/177*  (2014.01)
  *H04W 28/02*  (2009.01)
  *H04W 28/08*  (2023.01)

(52) U.S. Cl.
  CPC ...... *H04N 19/177* (2014.11); *H04W 28/0205* (2013.01); *H04W 28/0908* (2020.05)

(58) Field of Classification Search
  USPC ........................................................ 370/528
  See application file for complete search history.

(56) References Cited

U.S. PATENT DOCUMENTS

| | | | | |
|---|---|---|---|---|
| 2016/0156950 | A1* | 6/2016 | Bangma | H04N 21/43 |
| | | | | 725/116 |
| 2020/0059942 | A1 | 2/2020 | Itoh et al. | |
| 2023/0199600 | A1* | 6/2023 | Xu | H04W 72/54 |
| | | | | 370/331 |
| 2023/0403239 | A1* | 12/2023 | Peng | H04L 47/323 |
| 2024/0283745 | A1* | 8/2024 | Chen | H04L 47/28 |
| 2024/0323130 | A1* | 9/2024 | Yu | H04L 47/28 |

FOREIGN PATENT DOCUMENTS

| | | | |
|---|---|---|---|
| CN | 115038126 A | 9/2022 | |
| CN | 115038174 A | 9/2022 | |
| JP | WO2018078677 A1 | 9/2019 | |
| WO | WO-2016192466 A1 * | 12/2016 | .......... H04W 72/542 |
| WO | 2021067437 A1 | 4/2021 | |

OTHER PUBLICATIONS

International Search Report and Written Opinion for PCT Application No. PCT/CN2022/135867, Mailed Feb. 20, 2023, 12 pages.

First Japanese Office Action for Japanese Patent Application No. 2024-532957 dated Apr. 25, 2025. 11 pages.

* cited by examiner

INFORMATION TRANSMISSION METHOD AND APPARATUS, TERMINAL, AND NETWORK-SIDE DEVICE

CROSS-REFERENCE TO RELATED APPLICATIONS

This application is a continuation of International Application No. PCT/CN2022/135867 filed on Dec. 1, 2022, which claims priority to Chinese Patent Application No. 202111467958.8 filed on Dec. 3, 2021, which are incorporated herein by reference in their entireties.

TECHNICAL FIELD

This application pertains to the field of communications technologies, and specifically, relates to an information transmission method and apparatus, a terminal, and a network-side device.

BACKGROUND

For services with delay requirements, such as extended reality (XR) services, picture frames periodically arrive in the XR services. For an picture frame data transmission model based on a set of frames (group of pictures, GoP), there are an I-frame, a P-frame, and a B-frame, where the I-frame has the largest amount of data, the P-frame has the second largest amount of data, and the B-frame has the smallest amount of data. The I-frame appears periodically, and there are several P-frames and B-frames between two I-frames.

If a plurality of users transmit XR services in a cell, and the XR services are based on a GoP model, if I-frames in the XR services of the plurality of users appear at very close times, a large air interface capacity is needed to send these I-frames, and air interface congestion may be caused. However, at other times, because there are few I-frames, the air interface capacity may not be fully utilized.

In other words, utilization of the air interface capacity is insufficient, and transmission performance is low.

SUMMARY

According to a first aspect, an information transmission method is provided and includes:
obtaining, by a terminal, arrival time advance information, where the arrival time advance information includes an arrival time advance of a target picture frame, and the arrival time advance is an advance of an actual arrival time of the target picture frame relative to a target arrival time; and
sending, by the terminal, the arrival time advance information to a network-side device.

According to a second aspect, an information transmission method is provided and includes:
receiving, by a first network-side device, arrival time advance information sent by a terminal, where the arrival time advance information includes an arrival time advance of a target picture frame, and the arrival time advance is an advance of an actual arrival time of the target picture frame relative to a target arrival time;
determining, by the first network-side device, an air interface transmission delay budget between the first network-side device and the terminal based on the arrival time advance information; and
transmitting, by the first network-side device, the picture frame based on the air interface transmission delay budget.

According to a third aspect, an information transmission method is provided and includes:
receiving, by a second network-side device, arrival time advance information sent by a terminal, where the arrival time advance information includes an arrival time advance of a target picture frame, and the arrival time advance is an advance of an actual arrival time of the target picture frame relative to a target arrival time; and
performing, by the second network-side device, at least one of the following operations based on the arrival time advance information:
determining an air interface transmission delay budget between a first network-side device and the terminal, and sending the air interface transmission delay budget to the first network-side device; and
sending the arrival time advance information to the first network-side device.

According to a fourth aspect, an information transmission apparatus is provided and includes:
an obtaining module, configured to obtain arrival time advance information, where the arrival time advance information includes an arrival time advance of a target picture frame, and the arrival time advance is an advance of an actual arrival time of the target picture frame relative to a target arrival time; and
a sending module, configured to send the arrival time advance information to a network-side device.

According to a fifth aspect, an information transmission apparatus is provided and includes:
a transmission module, configured to receive arrival time advance information sent by a terminal, where the arrival time advance information includes an arrival time advance of a target picture frame, and the arrival time advance is an advance of an actual arrival time of the target picture frame relative to a target arrival time; and
a determining module, configured to determine an air interface transmission delay budget between a first network-side device and the terminal based on the arrival time advance information, where
the transmission module is further configured to transmit the picture frame based on the air interface transmission delay budget.

According to a sixth aspect, an information transmission apparatus is provided and includes:
a receiving module, configured to receive arrival time advance information sent by a terminal, where the arrival time advance information includes an arrival time advance of a target picture frame, and the arrival time advance is an advance of an actual arrival time of the target picture frame relative to a target arrival time; and
an execution module, configured to perform at least one of the following operations based on the arrival time advance information:
determining an air interface transmission delay budget between a first network-side device and the terminal, and sending the air interface transmission delay budget to the first network-side device; and
sending the arrival time advance information to the first network-side device.

According to a seventh aspect, a terminal is provided. The terminal includes a processor and a memory. The memory stores a program or instructions capable of running on the processor. When the program or instructions are executed by the processor, the steps of the method according to the first aspect are implemented.

According to an eighth aspect, a terminal is provided and includes a processor and a communication interface. The processor is configured to obtain arrival time advance information, where the arrival time advance information includes an arrival time advance of a target picture frame, and the arrival time advance is an advance of an actual arrival time of the target picture frame relative to a target arrival time; and the communication interface is configured to send the arrival time advance information to a network-side device.

According to a ninth aspect, a network-side device is provided. The network-side device includes a processor and a memory. The memory stores a program or instructions capable of running on the processor. When the program or instructions are executed by the processor, the steps of the method according to the second aspect or the third aspect are implemented.

According to a tenth aspect, a network-side device is provided and includes a processor and a communication interface. The communication interface is configured to: receive arrival time advance information sent by a terminal, where the arrival time advance information includes an arrival time advance of a target picture frame, and the arrival time advance is an advance of an actual arrival time of the target picture frame relative to a target arrival time; and transmit the picture frame based on the air interface transmission delay budget; and the processor is configured to determine an air interface transmission delay budget between the network-side device and the terminal based on the arrival time advance information.

According to an eleventh aspect, a network-side device is provided and includes a processor and a communication interface. The communication interface is configured to: receive arrival time advance information sent by a terminal, where the arrival time advance information includes an arrival time advance of a target picture frame, and the arrival time advance is an advance of an actual arrival time of the target picture frame relative to a target arrival time; and the processor is configured to perform at least one of the following operations based on the arrival time advance information:

determining an air interface transmission delay budget between a first network-side device and the terminal, and sending the air interface transmission delay budget to the first network-side device; and sending the arrival time advance information to the first network-side device.

According to a twelfth aspect, a communications system is provided and includes a terminal and a network-side device. The terminal may be configured to perform the steps of the information transmission method according to the first aspect, and the network-side device may be configured to perform the steps of the information transmission method according to the second aspect or the third aspect.

According to a thirteenth aspect, a readable storage medium is provided. The readable storage medium stores a program or instructions. When the program or instructions are executed by a processor, the steps of the method according to the first aspect, the second aspect, or the third aspect are implemented.

According to a fourteenth aspect, a chip is provided. The chip includes a processor and a communication interface. The communication interface is coupled to the processor. The processor is configured to run a program or instructions to implement the steps of the method according to the first aspect, the second aspect, or the third aspect.

According to a fifteenth aspect, a computer program product is provided. The computer program product is stored in a storage medium. The computer program product is executed by at least one processor to implement the steps of the information transmission method according to the first aspect, the second aspect, or the third aspect.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specified order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (NR) system is described for an illustrative purpose, and NR terms are used in most of the following descriptions. These technologies may also be applied to other applications than an NR system application, for example, a 6th Generation (6G) communications system.

Figure 1:
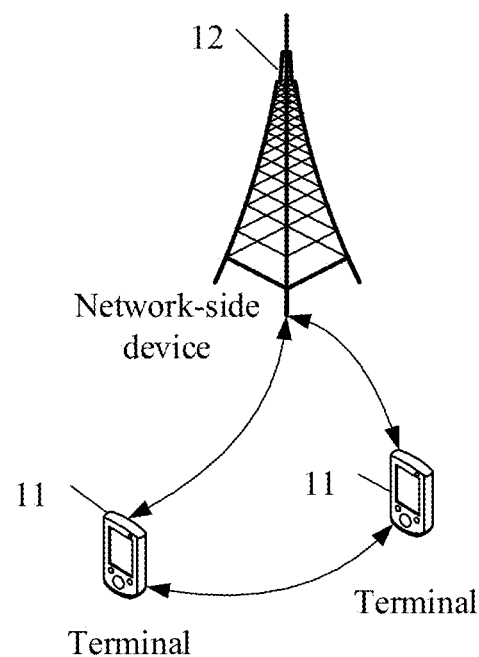
FIG. 1 is a structural diagram of a wireless communications system according to an embodiment of this application.

FIG. 1 is a block diagram of a wireless communications system to which an embodiment of this application may be applied. The wireless communications system includes a terminal 11 and a network-side device 12. The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), an augmented reality (AR) or virtual reality (VR) device, a robot, a wearable device, vehicle user equipment (VUE), pedestrian user equipment (PUE), a smart home (a home device having a wireless communication function, such as a refrigerator, a television, a washing machine, or furniture), a game console, a personal computer (PC), a teller machine, or a self-service machine. The wearable device includes a smartwatch, a smart band, a smart headphone, smart glasses, smart jewelry (a smart bracelet, a smart wrist chain, a smart ring, a smart necklace, a smart anklet, a smart ankle chain, or the like), a smart wristband, smart clothing, or the like. It should be noted that a specific type of the terminal 11 is not limited in the embodiments of this application. The network-side device 12 may include an access network device or a core network device. The access network device may also be referred to as a radio access network device, a radio access network (RAN), a radio access network function, or a radio access network element. The access network device 12 may include a base station, a wireless local area network (WLAN) access point, a Wi-Fi node, or the like. The base station may be referred to as a NodeB, an evolved NodeB (eNB), an access point, a base transceiver station (Base Transceiver Station, BTS), a radio base station, a radio transceiver, a basic service set (BSS), an extended service set (ESS), a home NodeB, a home evolved NodeB, a transmission and reception point (TRP), or another appropriate term in the art. As long as the same technical effect is achieved, the base station is not limited to specific technical terms. It should be noted that in the embodiments of this application, only a base station in an NR system is used as an example for description, but a specific type of the base station is not limited.

For better understanding the embodiments of this application, the following briefly describes related content of extended reality (XR) services.

The XR services include an augmented reality (AR) service, a virtual reality (VR) service, and a mixed AR and VR (MR) service. The XR services can use an H.264 encoding technology to compress image data, to achieve an objective of reducing traffic and ensuring image quality. The H.264 technology can encode image data into three types of picture frames.

An intra-coded (Intra-coded picture, I) frame is a complete picture frame that can be generated and presented without relying on other frames.

A forward predicted (Predicted picture, P) frame includes only image change information relative to a previous frame, and a receiver needs to generate a current frame with reference to the previous frame and display the current frame on a receiving terminal.

A bi-directionally predicted (Bidirectional predicted picture, B) frame is used to indicate change information of the current frame relative to the previous frame and a following frame, and the receiver needs to generate the current frame with reference to the previous frame and the following frame.

The previous frame and the following frame are ordered by frame presentation time or image capture time at a source. An actual sending time and an actual receiving time may be adjusted based on an image decoding time of the receiver. For example, a sender may perform sending in an picture frame decoding time sequence of the receiver.

Different frame types correspond to different frame encoding methods, resulting in different degrees of image compression. The I-frame has a low degree of compression (that is, an amount of frame data is the largest), the P-frame has a moderate degree of compression (that is, an amount of frame data is moderate), and the B-frame has the highest degree of compression (that is, an amount of frame data is the smallest).

There are two transmission modes for XR images: a transmission mode based on a frame slice combination and a transmission mode based on a set of frames (group of pictures, GoP).

Transmission mode based on a frame slice combination: An picture frame is sliced into a plurality of data blocks, and then sliced blocks of a plurality of picture frames are scattered and combined into a plurality of data blocks for transmission, to achieve an objective of smoothing traffic of a data flow of an XR service. This greatly reduces traffic fluctuation caused by differences between data amounts of I-frames, P-frames, and B-frames, but increases a transmission delay of picture frames due to cross-transmission of the picture frames.

Transmission mode based on a set of frames: A video is divided into video frame combinations based on periodic characteristics of a video stream, where all P-frames and B-frames between an I-frame and a next adjacent I-frame constitute a frame combination. An picture frame is transmitted according to a frame period and played on the receiver, and a time interval between a frame arrival time of the picture frame and that of an adjacent picture frame is one frame period. The transmission mode based on the set of frames avoids mixed transmission of picture frames, so that the generated picture frames can be transmitted in time. Due to different compression degrees of I-frames, P-frames, and B-frames, a frame data rate fluctuates.

Figure 2A:
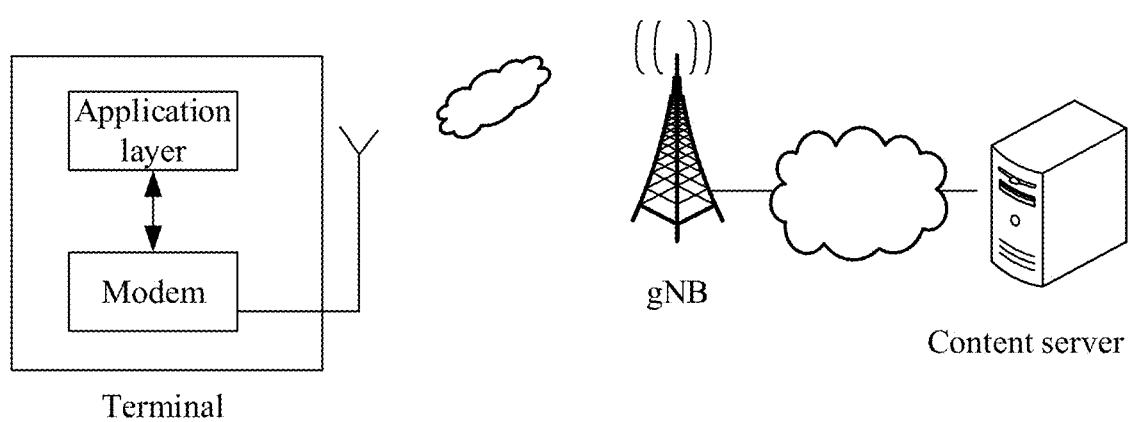
FIG. 2a is a schematic diagram of a network structure for transmitting XR service data between a terminal and a content server.
Figure 2B:
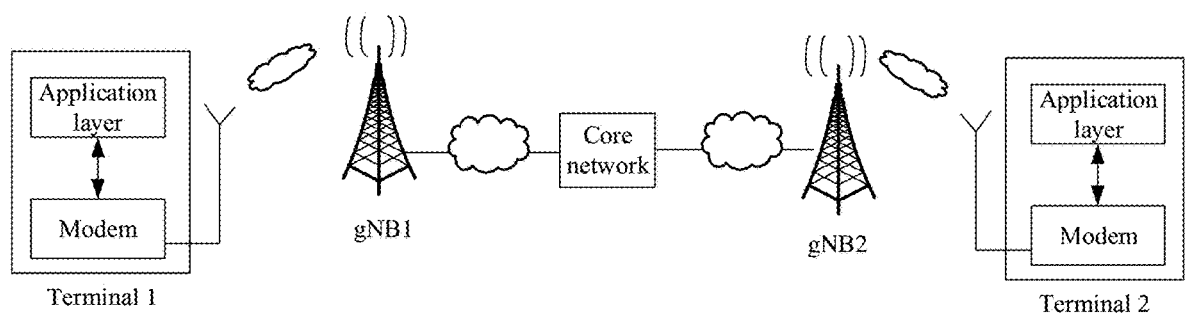
FIG. 2b is a schematic diagram of a network structure for transmitting XR service data between two terminals.

Data transmission of XR service data in an NR network is shown in FIG. 2a and FIG. 2b. FIG. 2a shows that UE obtains XR service data from a content server over the wireless network by using a modem of the UE. FIG. 2b shows XR service data transmission between two terminals. The modem of the UE and a base station run a wireless transmission protocol to complete XR service data transmission.

An information transmission method provided in the embodiments of this application is hereinafter described in detail by using some embodiments and application scenarios thereof with reference to the accompanying drawings.

Figure 3:
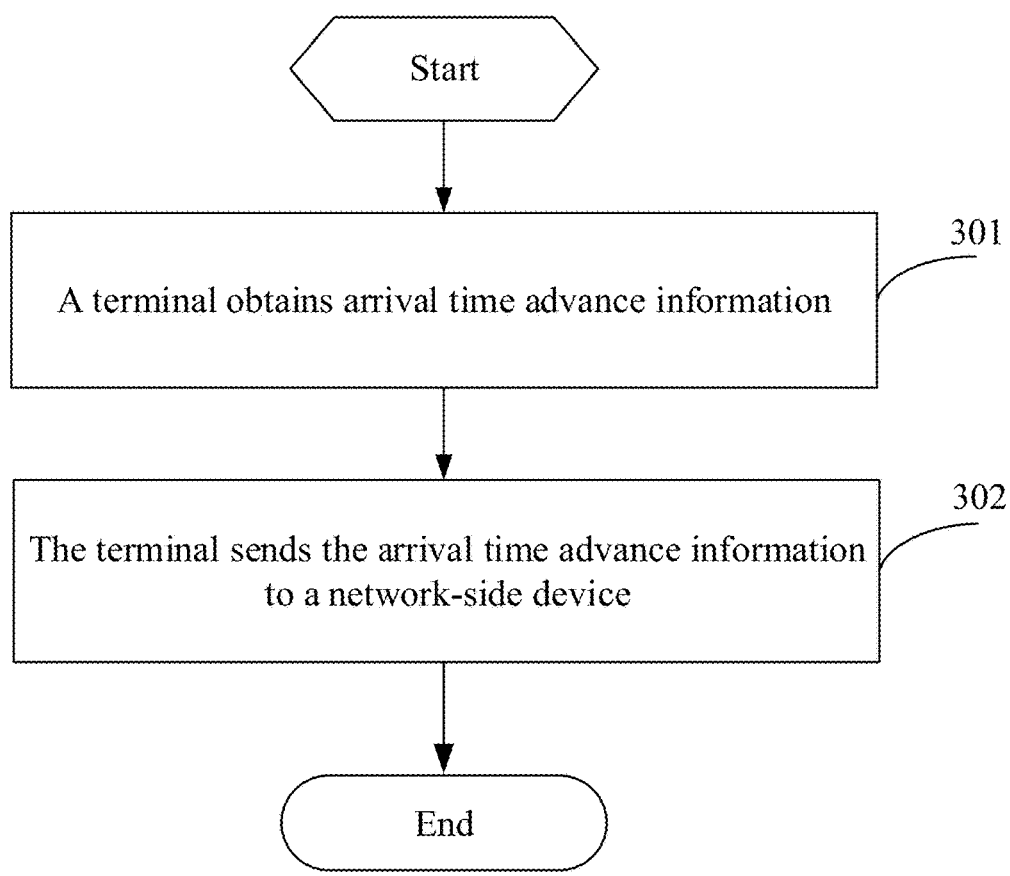
FIG. 3 is a first flowchart of an information transmission method according to an embodiment of this application.

FIG. 3 is a flowchart of an information transmission method according to an embodiment of this application. The information transmission method includes the following steps.

Step 301: A terminal obtains arrival time advance information, where the arrival time advance information includes an arrival time advance of a target picture frame, and the arrival time advance is an advance of an actual arrival time of the target picture frame relative to a target arrival time.

Step 302: The terminal sends the arrival time advance information to a network-side device.

After receiving the arrival time advance information, the network-side device determines an air interface transmission delay budget based on the arrival time advance information, performs scheduling based on the air interface transmission delay budget, and transmits the picture frame. The air interface transmission delay budget includes an uplink transmission delay budget and/or a downlink transmission delay budget.

In this embodiment, the terminal obtains the arrival time advance information, where the arrival time advance information includes the arrival time advance of the target picture frame, and the arrival time advance is the advance of the actual arrival time of the target picture frame relative to the target arrival time; and the terminal sends the arrival time advance information to the network-side device. Because the network-side device can determine the air interface transmission delay budget based on the arrival time advance information sent by the terminal, when a time advance indicated by the arrival time advance information is a positive value, the network-side device can increase the air interface transmission delay budget, that is, the network-side device can flexibly adjust a transmission time of the picture frame within a longer air interface transmission delay budget. For example, the network-side device can comprehensively consider actual transmission delay requirements of picture frames of different users on an air interface and actual load on the air interface, and flexibly adjust the transmission time of the picture frames of different users within a longer air interface transmission delay budget. Therefore, an air interface transmission rate can be smoothed, efficiency of link adaptation can be improved, and transmission performance can be improved.

The network-side device may be a base station or a core network device. If the network-side device is the base station, the base station can determine an air interface transmission delay budget between the base station and the terminal. If the network-side device is the core network device, the core network device can determine the air interface transmission delay budget between the base station and the terminal. For example, the core network device configures an air interface uplink transmission delay budget and/or an air interface downlink transmission delay budget of the base station.

In the network structure shown in FIG. 2a, transmission information goes through only one air interface network, and the core network device can configure the air interface uplink or downlink delay budget of the base station based on the received arrival time advance information. In the network structure shown in FIG. 2b, transmission information goes through an air interface network on either side of the core network, and the core network device can configure, based on the received arrival time advance information, a base station on either side or base stations on both sides to update the air interface transmission delay budget of the air interface. This method can help enhance an end-to-end delay management function of the core network device.

The actual arrival time includes one of the following:
a time of receiving a last data packet when the terminal receives a data packet included in the target picture frame; and
a time of obtaining the target picture frame by the terminal by parsing the data packet included in the target picture frame, for example, a time of obtaining (which may also be understood as restoring) the target picture frame by an application layer of the terminal through parsing.

The target arrival time includes one of the following:
a target play time of the target picture frame, where the target play time is an actual or predicted time when the target picture frame is played;
a latest arrival time that does not affect playing of the target picture frame;
a time obtained by forward-shifting, by a first offset time, the latest arrival time that does not affect playing of the target picture frame; and
a time obtained by forward-shifting by a second offset time relative to the target play time of the target picture frame.

The first offset time and the second offset time may be set based on an actual situation.

The arrival time advance includes an arrival time advance of each of an I-frame, a P-frame, and a B-frame, or an arrival time advance of the target picture frame obtained without distinguishing between an I-frame, a P-frame, and a B-frame, where the target picture frame includes the I-frame, the P-frame, and the B-frame.

The arrival time advance information further includes at least one of the following:

(1) Information about a first determining method and first indication information, where the information about the first determining method includes the first determining method and/or an identifier of the first determining method, the first indication information is used to indicate a parameter of the first determining method, and the first determining method is used to determine the actual arrival time of the target picture frame.

The first determining method may be a method for determining the actual arrival time of the target picture frame. The identifier of the first determining method may be a method name or an identifier (ID) of the first determining method. The arrival time advance information includes the information about the first determining method, and can inform the network-side device based on which method the terminal determines the actual arrival time of the target picture frame.

For example, if one or more first determining methods are preconfigured, and each of the one or more first determining methods corresponds to an identifier, and the identifier may be a method name, an ID, or the like, the information about the first determining method may include the first determining method, and may also include the identifier corresponding to the first determining method. In addition, the arrival time advance information further includes first indication information, and the first indication information is used to indicate a parameter or parameter value of the first determining method.

(2) Information about a second determining method, where the information about the second determining method includes the second determining method and/or an identifier of the second determining method, and the second determining method is used to determine the arrival time advance of the target picture frame.

The second determining method may be a method for determining the arrival time advance of the target picture frame. The identifier of the second determining method may be a method name or an ID of the second determining method. The arrival time advance information includes the information about the second determining method, and can inform the network-side device based on which method the terminal determines the arrival time advance of the target picture frame.

For example, if one or more second determining methods are preconfigured, and each of the one or more second determining methods corresponds to an identifier, and the identifier may be a method name, an ID, or the like, the information about the second determining method may include the second determining method, and may also include the identifier corresponding to the second determining method.

In an embodiment of this application, the target picture frame includes at least one picture frame, and the arrival time advance of the target picture frame is determined based on an arrival time advance of each of the at least one picture frame.

Specifically, the arrival time advance is obtained by reserving a first preset time on a first advance, and the first advance is obtained through calculation based on the arrival time advance of each of the at least one picture frame. The reserving a first preset time on a first advance may be understood as adding the first preset time to the first advance. The first preset time may be set based on an actual situation, and is not limited herein. The first preset time may be autonomously determined by the terminal or configured by the network-side device.

Figure 4:
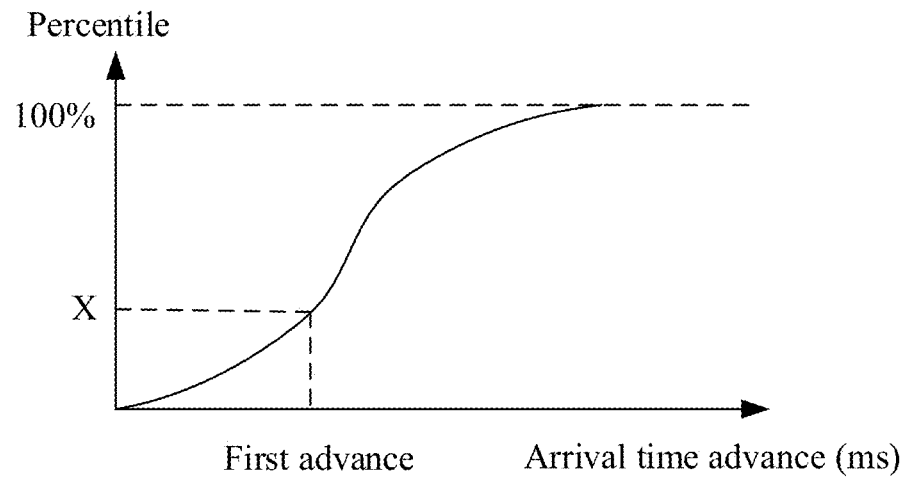
FIG. 4 is a probability distribution function graph according to an embodiment of this application.

For ease of description, any one of the at least one picture frame is referred to as a first picture frame, and an arrival time advance of the first picture frame is a target arrival time of the first picture frame minus an actual arrival time of the first picture frame. In the foregoing manner, the arrival time advance of each of the at least one picture frame is obtained. For example, if there are 20 picture frames, 20 arrival time advances may be obtained based on the 20 picture frames. The arrival time advances may be the same or different. Further, based on the arrival time advance of each picture frame, a cumulative distribution function (CDF) of the arrival time advances is obtained, that is, the cumulative distribution function is determined based on the arrival time advance of each picture frame. As shown in FIG. 4, the cumulative distribution function is obtained based on the arrival time advance of each picture frame. The arrival time advance of the target picture frame is an arrival time advance corresponding to a preset percentile X in the cumulative distribution function, where X may be autonomously determined by the terminal or configured by the network-side device.

Moreover, in addition to determining the arrival time advance of the target picture frame based on the cumulative distribution function of the arrival time advance, the terminal may obtain the advance in other manners. This is not limited herein.

A manner of sending the arrival time advance information includes at least one of the following:
periodic sending, sending based on a trigger condition, and sending based on a request. The manner of sending may be configured by the network-side device. The manner of sending may use uplink control information (UCI), a media access control control element (MAC CE), or RRC signaling for reporting.

Periodic sending may also be referred to as a periodic trigger manner. The network-side device configures a sending period and an offset, which may be configured by using one of RRC signaling, a MAC CE, and a physical downlink control channel (PDCCH) or configured by using a combination of a plurality of types of signaling.

Sending based on the trigger condition may also be referred to as reporting based on an event trigger, and may be configured by the network-side device based on RRC signaling. The trigger condition includes at least one of the following:
(1) the arrival time advance of the target picture frame exceeds a first preset threshold;
(2) the arrival time advance of the target picture frame is less than a second preset threshold;
(3) an increment exceeds a third preset threshold, where the increment is an increment of the arrival time advance of the target picture frame in comparison with an arrival time advance sent to the network-side device last time;
(4) a decrement exceeds a fourth preset threshold, where the decrement is a decrement of the arrival time advance of the target picture frame in comparison with the arrival time advance sent to the network-side device last time;
(5) the arrival time advance of the target picture frame is a negative value;
(6) the terminal is handed over to another cell; and
(7) after a radio link of the terminal fails, the radio link is successfully restored.

In a case that at least one of the trigger conditions is met, the terminal sends the arrival time advance information to the network-side device.

Sending based on the request may also be understood as sending based on a query of the network-side device. The network-side device sends query information (carried by RRC signaling or a MAC CE). After receiving the query information, the terminal obtains the arrival time advance information and sends the arrival time advance information to the network-side device.

Specifically, before the terminal sends the arrival time advance information to the network-side device, the method further includes:
the terminal receives, by using a modem of the terminal, request information sent by the network-side device, where the request information is used to request the terminal to send the arrival time advance information; and
the terminal obtains the arrival time advance information by using the application layer of the terminal.

The terminal includes the modem and the application layer. The terminal receives the request information (that is, query information) by using the modem (such as a wireless protocol layer of the modem). The terminal obtains the arrival time advance information of the target picture frame from the application layer (also referred to as an XR application layer). The terminal sends the arrival time advance information to the network-side device by using the modem. Specifically, the terminal sends the arrival time advance information to the network-side device by using the modem of the terminal.

The terminal further includes an adaptation layer located between the application layer and the modem. The adaptation layer is configured to convert information sent by the modem into a format parsable by the application layer, and/or convert information sent by the application layer into a format parsable by the modem.

The adaptation layer is located in an operating system of the terminal, or located between the modem of the terminal and the application layer of the terminal. The terminal may further include an application control layer. The application control layer is configured to convert the request information sent by the modem of the terminal into a format parsable by the application layer of the terminal, and/or convert the arrival time advance information sent by the application layer of the terminal into a format parsable by the modem of the terminal. Further, the modem of the terminal includes an RRC layer, and the application control layer is located between the RRC layer and the adaptation layer.

Figure 5:
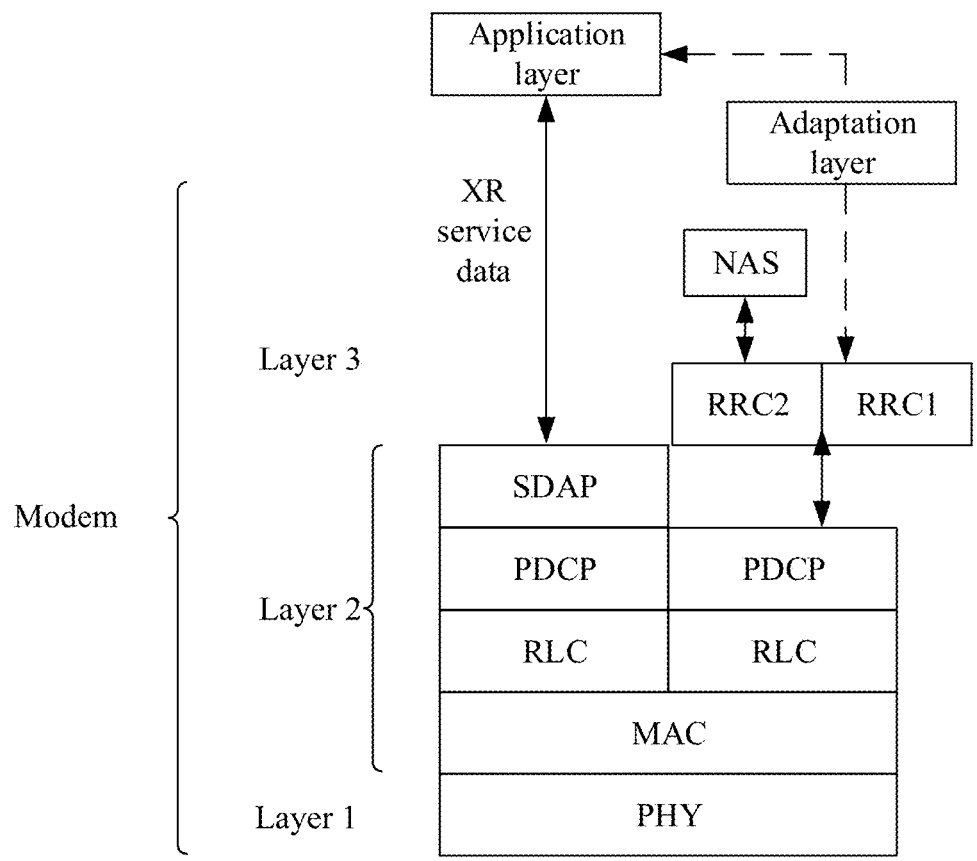
FIG. 5 is a relationship structural diagram between a modem, an application layer, and an adaptation layer of a terminal according to an embodiment of this application.

FIG. 5 is a structural relationship diagram between the modem, the application layer, and the adaptation layer of the terminal. As shown in FIG. 5, the radio resource control (RRC) layer (hereinafter referred to as the wireless protocol layer) of the modem of the terminal and the upper application layer cannot exchange information based on an existing protocol. The adaptation layer may be added between the two layers. The adaptation layer may be located in the operating system of the terminal, or used as a sub-layer of the application layer or the wireless protocol layer. A function of the adaptation layer is to convert a configuration message or request information that is sent by the RRC layer to the application layer and that is used for requesting the arrival time advance information into a format parsable by the application layer, and convert the arrival time advance information sent by the application layer to the RRC layer into a format parsable by the RRC layer. Optionally, the adaptation layer provides some functions for access by the application layer and the RRC layer. The application layer invokes these functions to obtain the request information or the configuration message from the RRC layer, or sends the arrival time advance information of the picture frame to the RRC layer; and the RRC layer invokes some functions to send the request information or the configuration message to the application layer, or obtains the arrival time advance information of the picture frame from the application layer.

FIG. 5 shows an example of a protocol layer structure of the terminal including the adaptation layer, where the RRC layer is configured to process interaction with the application layer. In addition, the application control (APP Control) layer may be introduced above the RRC layer. The application control layer is a sub-layer of layer 3 and is configured to process interaction with the application layer.

In FIG. 5, layer 1 includes a physical layer (Physical, PHY), layer 2 includes radio link control (RLC), a packet data convergence protocol (PDCP), and a service data adaptation protocol (SDAP), and layer 3 includes RRC1, RRC2, a non-access stratum (NAS), and the adaptation layer.

In an embodiment of this application, the arrival time advance information further includes at least one of the following:
- a processing delay budget of the application layer of the terminal;
- a processing delay budget of the modem of the terminal; and
- an end-to-end processing delay budget determined by the application layer of the terminal based on meeting a service quality requirement.

Figure 6:
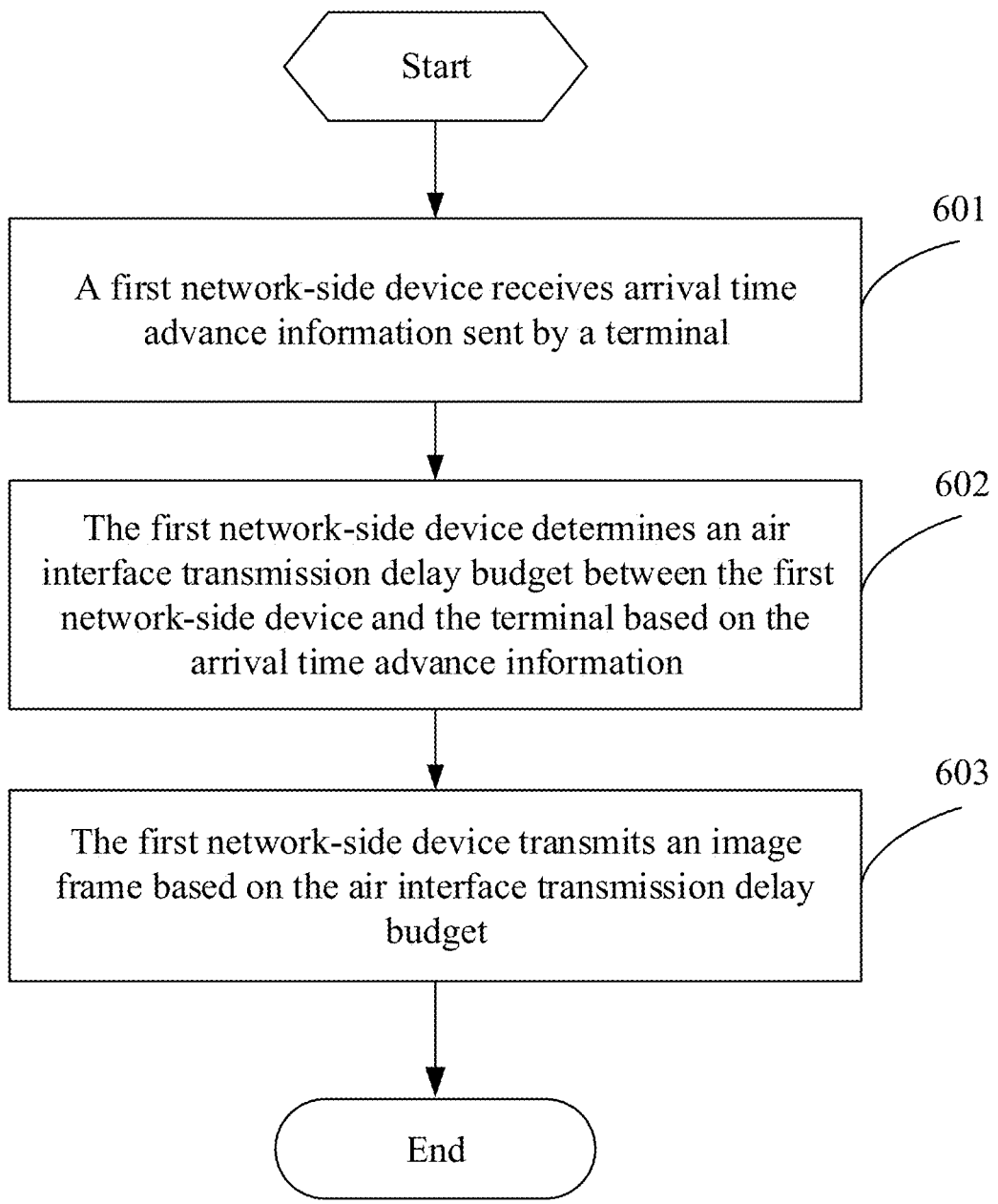
FIG. 6 is a second flowchart of an information transmission method according to an embodiment of this application.

FIG. 6 is a flowchart of an information transmission method according to an embodiment of this application. The information transmission method includes the following steps.

Step 601: A first network-side device receives arrival time advance information sent by a terminal, where the arrival time advance information includes an arrival time advance of a target picture frame, and the arrival time advance is an advance of an actual arrival time of the target picture frame relative to a target arrival time.

Step 602: The first network-side device determines an air interface transmission delay budget between the first network-side device and the terminal based on the arrival time advance information. For example, a new air interface transmission delay budget is a function of a current air interface transmission delay budget and the arrival time advance. When the arrival time advance is a positive value, the network-side device may extend the air interface transmission delay budget. Conversely, when the arrival time advance is a negative value, the network-side device may reduce the delay budget of the network-side device.

Step 603: The first network-side device transmits the picture frame based on the air interface transmission delay budget.

After receiving the arrival time advance information, the network-side device determines the air interface transmission delay budget based on the arrival time advance information, performs scheduling based on the air interface transmission delay budget, and transmits the picture frame. The air interface transmission delay budget includes an uplink transmission delay budget and/or a downlink transmission delay budget.

In this embodiment, the first network-side device receives the arrival time advance information sent by the terminal, where the arrival time advance information includes the arrival time advance of the target picture frame, and the arrival time advance is the advance of the actual arrival time of the target picture frame relative to the target arrival time; the first network-side device determines the air interface transmission delay budget between the first network-side device and the terminal based on the arrival time advance information; and the first network-side device transmits the picture frame based on the air interface transmission delay budget. Because the network-side device can determine the air interface transmission delay budget based on the arrival time advance information sent by the terminal, when a time advance indicated by the arrival time advance information is a positive value, the network-side device can increase the air interface transmission delay budget, that is, the network-side device can flexibly adjust a transmission time of the picture frame within a longer air interface transmission delay budget. For example, the network-side device can comprehensively consider actual transmission delay requirements of picture frames of different users on an air interface and actual load on the air interface at different times, and flexibly adjust the transmission time of the picture frames of different users within the air interface transmission delay budget. Therefore, an air interface transmission rate can be smoothed, efficiency of link adaptation can be improved, and transmission performance can be improved.

The actual arrival time includes one of the following:
- a time of receiving a last data packet when the terminal receives a data packet included in the target picture frame; and
- a time of obtaining the target picture frame by the terminal by parsing the data packet included in the target picture frame.

The target arrival time includes one of the following:
- a target play time of the target picture frame, where the target play time is an actual or predicted time when the target picture frame is played;
- a latest arrival time that does not affect playing of the target picture frame;
- a time obtained by forward-shifting, by a first offset time, the latest arrival time that does not affect playing of the target picture frame; and
- a time obtained by forward-shifting by a second offset time relative to the target play time of the target picture frame.

The arrival time advance includes an arrival time advance of each of an intra-coded I-frame, a forward predicted P-frame, and a bi-directionally predicted B-frame, or an arrival time advance of the target picture frame obtained without distinguishing between an I-frame, a P-frame, and a B-frame, where the target picture frame includes the I-frame, the P-frame, and the B-frame.

The arrival time advance information further includes at least one of the following:
- information about a first determining method and first indication information, where the information about the first determining method includes the first determining method and/or an identifier of the first determining method, the first indication information is used to indicate a parameter of the first determining method, and the first determining method is used to determine the actual arrival time of the target picture frame; and
- information about a second determining method, where the information about the second determining method includes the second determining method and/or an identifier of the second determining method, and the second determining method is used to determine the arrival time advance of the target picture frame.

A manner of sending the arrival time advance information may include at least one of periodic sending, sending based on a trigger condition, and sending based on a request. Sending based on the request may also be understood as sending based on request information sent by the first network-side device. In other words, before the first network-side device receives the arrival time advance information sent by the terminal, the method further includes:
- the first network-side device sends, to the terminal, request information for requesting the arrival time advance information.

The arrival time advance information further includes at least one of the following:
- a processing delay budget of an application layer of the terminal;
- a processing delay budget of a modem of the terminal; and
- an end-to-end processing delay budget determined by the application layer of the terminal based on meeting a service quality requirement.

Figure 7A:
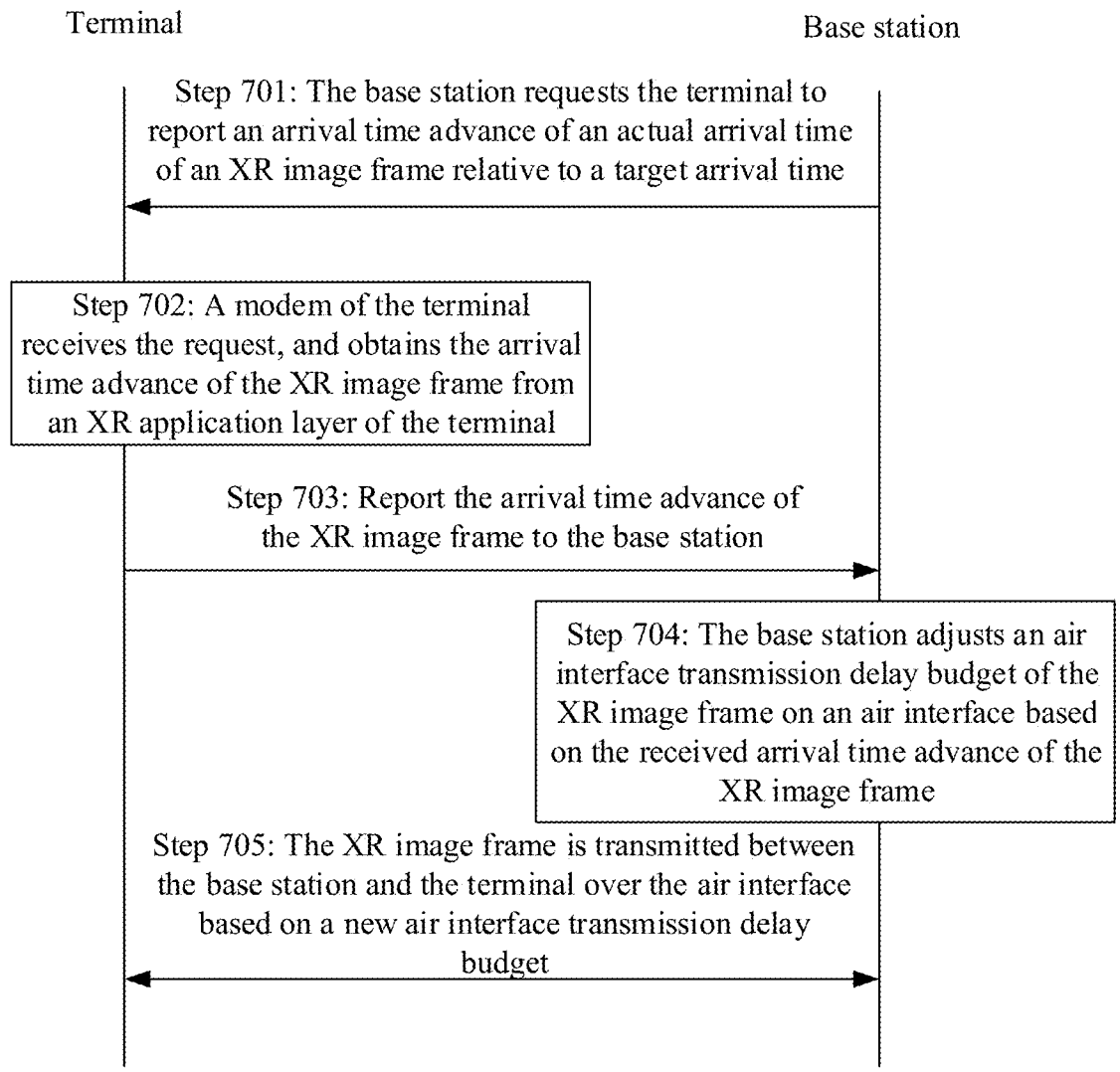
FIG. 7a is a third flowchart of an information transmission method according to an embodiment of this application.

The following uses an XR picture frame as an example to describe an information transmission method provided in this application. FIG. 7a is a flowchart of information interaction between a terminal and a base station.

Step 701: The base station requests the terminal to report an arrival time advance of an actual arrival time of an XR picture frame relative to a target arrival time.

Step 702: After receiving the request, a wireless protocol layer of a modem of the terminal obtains the arrival time advance of the XR picture frame from an XR application layer of the terminal.

Step 703: The terminal reports the arrival time advance of the XR picture frame to the base station by using the wireless protocol layer of the modem.

Step 704: The base station adjusts an air interface transmission delay budget of the XR picture frame on an air interface based on the received arrival time advance of the XR picture frame.

Step 705: The XR picture frame is transmitted between the base station and the terminal over the air interface based on a new air interface transmission delay budget.

Figure 7B:
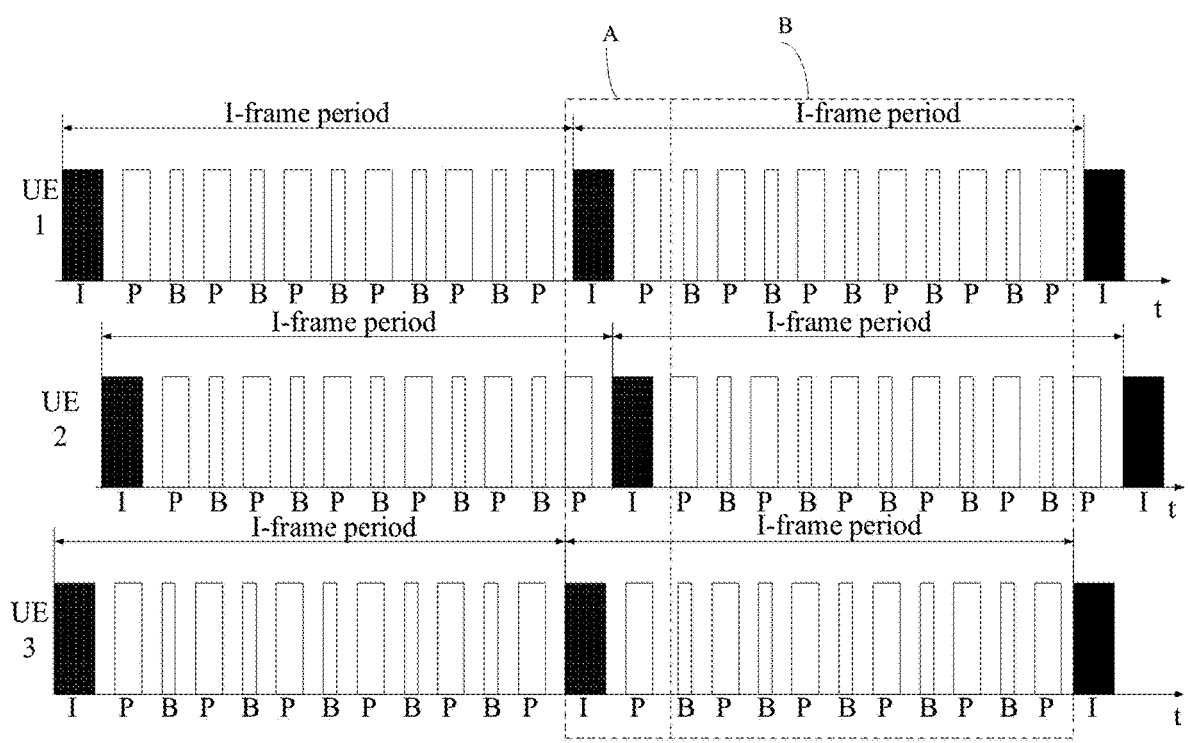
FIG. 7b is a schematic diagram of arrival times of I-frames in XR services of a plurality of terminals.
Figure 7C:
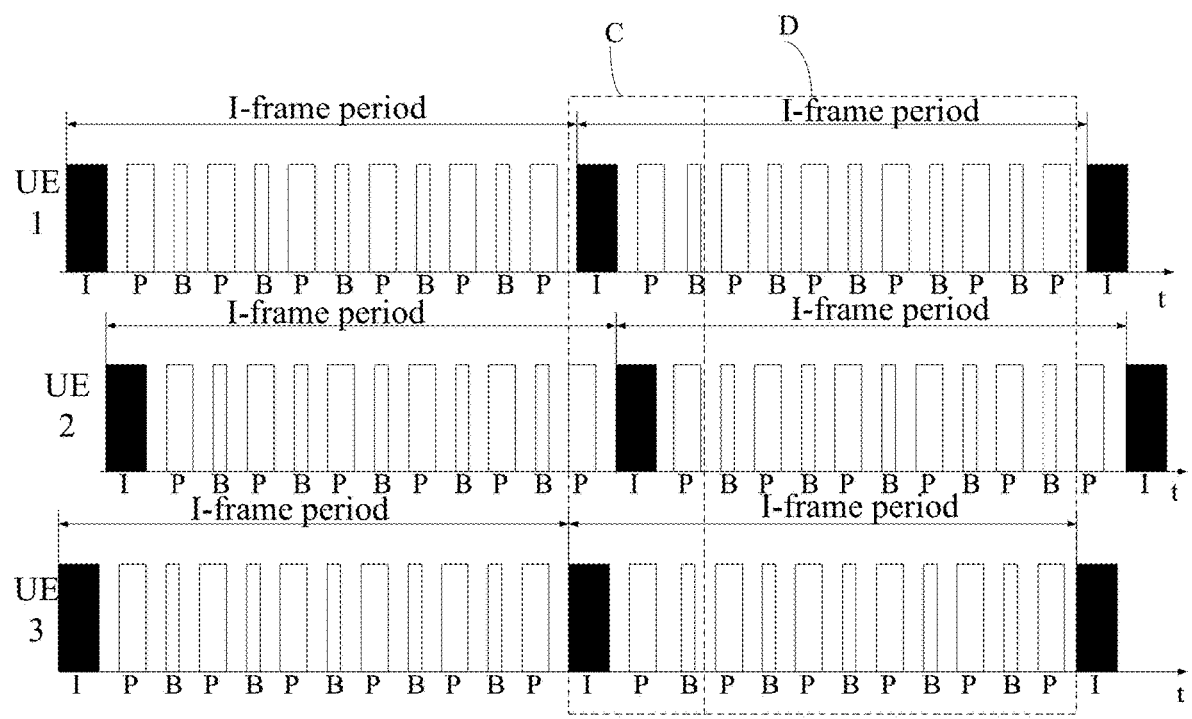
FIG. 7c is a schematic diagram of arrival times of I-frames in XR services of a plurality of terminals after an air interface transmission delay budget is adjusted according to an embodiment of this application.

FIG. 7b is a schematic diagram of arrival times of I-frames in XR services of a plurality of user equipments. FIG. 7c is a schematic diagram of arrival times of I-frames after an air interface transmission delay budget is adjusted by using the method provided in this application. UE 1, UE 2, and UE 3 are three terminals in a cell. Each GoP includes 12 frames, including one I-frame and 11 P-frames or B-frames. In FIG. 7b, due to occasionality of service occurrence, I-frames of the three UEs appear at close times, resulting in dense I-frames in the cell within a small time window. For example, a time window labeled A requires an extremely high rate to meet a transmission delay requirement. This may make the cell unable to provide a sufficient rate to meet transmission quality (such as a delay requirement) of the I-frames; and in a time window labeled B, a proportion of I-frames is low but a proportion of P-frames or B-frames is high, a total required rate is low, and a rate that the system can provide is significantly higher than the total required rate, resulting in insufficient use of a cell capacity.

It can be seen from FIG. 7b and FIG. 7c that the transmission delay budget of the picture frame of the XR service can be increased. A time window labeled C is larger than the time window labeled A, and a time window labeled D is smaller than the time window labeled B. By adjusting the transmission delay budget of the picture frame of the XR service, the base station can comprehensively consider actual transmission delay requirements of XR picture frames of different users on the air interface and actual load on the air interface, and flexibly adjust the transmission time of the picture frames of different users. Therefore, XR service data rates can be smoothed. The method provided in this application can increase an XR service capacity of the network while meeting the data transmission delay requirement of the XR service.

Figure 8:
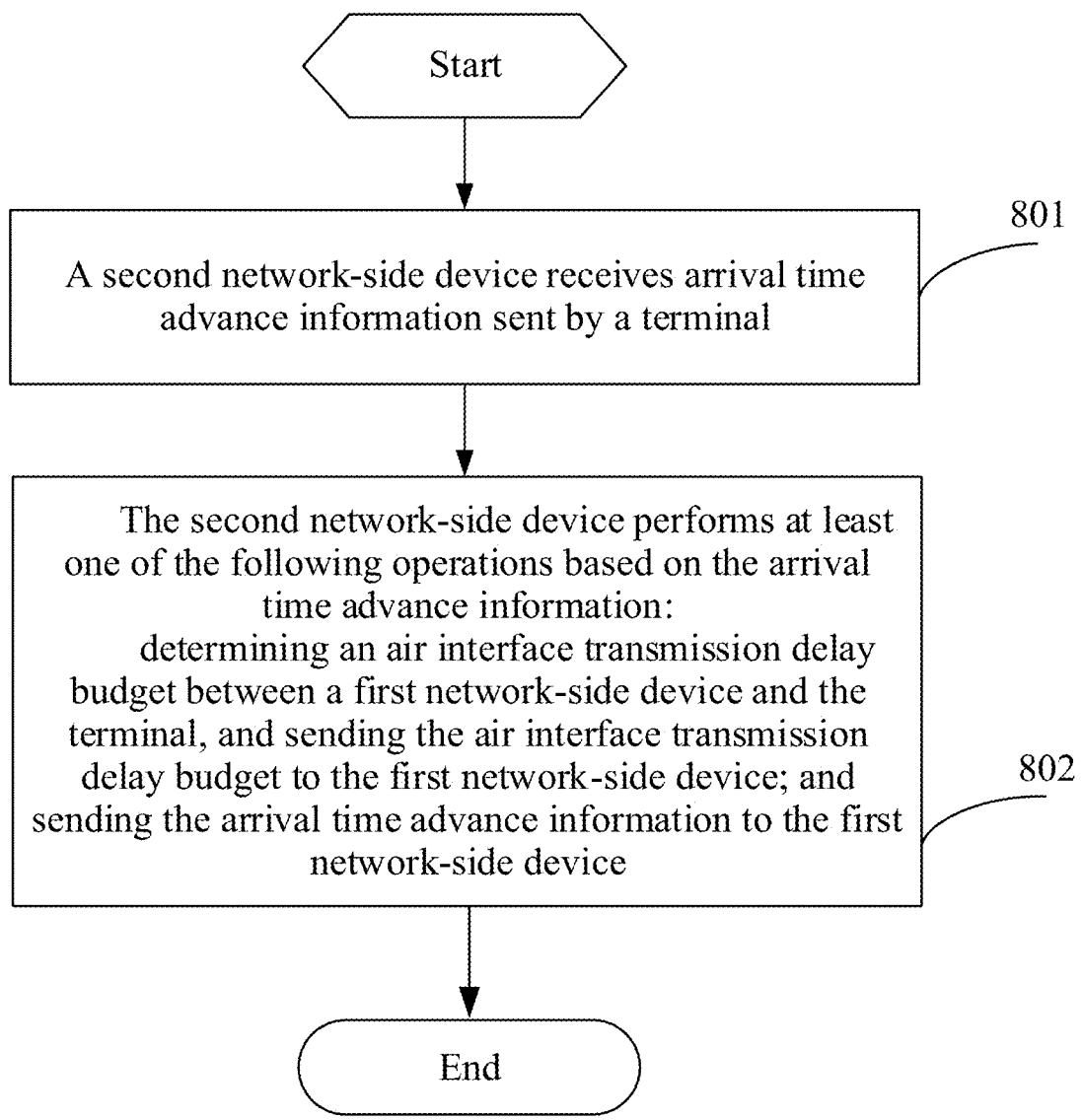
FIG. 8 is a fourth flowchart of an information transmission method according to an embodiment of this application.

FIG. 8 is a flowchart of an information transmission method according to an embodiment of this application. The information transmission method includes the following steps.

Step 801: A second network-side device receives arrival time advance information sent by a terminal, where the arrival time advance information includes an arrival time advance of a target picture frame, and the arrival time advance is an advance of an actual arrival time of the target picture frame relative to a target arrival time.

The second network-side device may be a core network device.

Step 802: The second network-side device performs at least one of the following operations based on the arrival time advance information:
(1) determining an air interface transmission delay budget between a first network-side device and the terminal, and sending the air interface transmission delay budget to the first network-side device; and
(2) sending the arrival time advance information to the first network-side device.

The first network-side device may be a base station. The second network-side device may determine the air interface transmission delay budget between the first network-side device and the terminal based on the arrival time advance information. The second network-side device may alternatively send the arrival time advance information to the first network-side device, and the first network-side device determines the air interface transmission delay budget between the first network-side device and the terminal.

In this embodiment, the second network-side device receives the arrival time advance information sent by the terminal, where the arrival time advance information includes the arrival time advance of the target picture frame, and the arrival time advance is the advance of the actual arrival time of the target picture frame relative to the target arrival time; and the second network-side device performs at least one of the following operations based on the arrival time advance information: determining the air interface transmission delay budget between the first network-side device and the terminal, and sending the air interface transmission delay budget to the first network-side device; and sending the arrival time advance information to the first network-side device. Because the second network-side device can determine the air interface transmission delay budget between the first network-side device and the terminal based on the arrival time advance information sent by the terminal, the first network-side device can flexibly adjust the information transmission time within the air interface transmission delay budget. Therefore, an air interface transmission rate can be smoothed, efficiency of link adaptation can be improved, and transmission performance can be improved.

The actual arrival time includes one of the following:
a time of receiving a last data packet when the terminal receives a data packet included in the target picture frame; and
a time of obtaining the target picture frame by the terminal by parsing the data packet included in the target picture frame.

The target arrival time includes one of the following:
a target play time of the target picture frame, where the target play time is an actual or predicted time when the target picture frame is played;
a latest arrival time that does not affect playing of the target picture frame;
a time obtained by forward-shifting, by a first offset time, the latest arrival time that does not affect playing of the target picture frame; and
a time obtained by forward-shifting by a second offset time relative to the target play time of the target picture frame.

The arrival time advance includes an arrival time advance of each of an intra-coded I-frame, a forward predicted P-frame, and a bi-directionally predicted B-frame, or an arrival time advance of the target picture frame obtained without distinguishing between an I-frame, a P-frame, and a B-frame, where the target picture frame includes the I-frame, the P-frame, and the B-frame.

The arrival time advance information further includes at least one of the following:
information about a first determining method and first indication information, where the information about the first determining method includes the first determining method and/or an identifier of the first determining method, the first indication information is used to indicate a parameter of the first determining method, and the first determining method is used to determine the actual arrival time of the target picture frame; and
information about a second determining method, where the information about the second determining method includes the second determining method and/or an identifier of the second determining method, and the second determining method is used to determine the arrival time advance of the target picture frame.

The arrival time advance information further includes at least one of the following:
a processing delay budget of an application layer of the terminal;
a processing delay budget of a modem of the terminal; and
an end-to-end processing delay budget determined by the application layer of the terminal based on meeting a service quality requirement.

The core network device or the base station configures the terminal to send the arrival time advance information to the core network device by using a NAS. After receiving the arrival time advance information, the core network device adjusts (which may be keeping unchanged, increasing, or decreasing), based on the arrival time advance information, a delay budget of the air interface that XR picture frame data goes through.

In the network structure shown in FIG. 2a, transmission information goes through only one air interface network, and the core network device can configure the air interface uplink or downlink delay budget of the base station based on the received arrival time advance information. In the network structure shown in FIG. 2b, transmission information goes through an air interface network on either side of the core network, and the core network device can configure, based on the received arrival time advance information, a base station on either side or base stations on both sides to update the air interface transmission delay budget of the air interface. This method can help enhance an end-to-end delay management function of the core network.

The information transmission method provided in FIG. 3 in this application may be performed by a first information transmission apparatus 900. An information transmission apparatus in an embodiment of this application is described by assuming that the information transmission method in this embodiment of this application is performed by the first information transmission apparatus.

Figure 9:
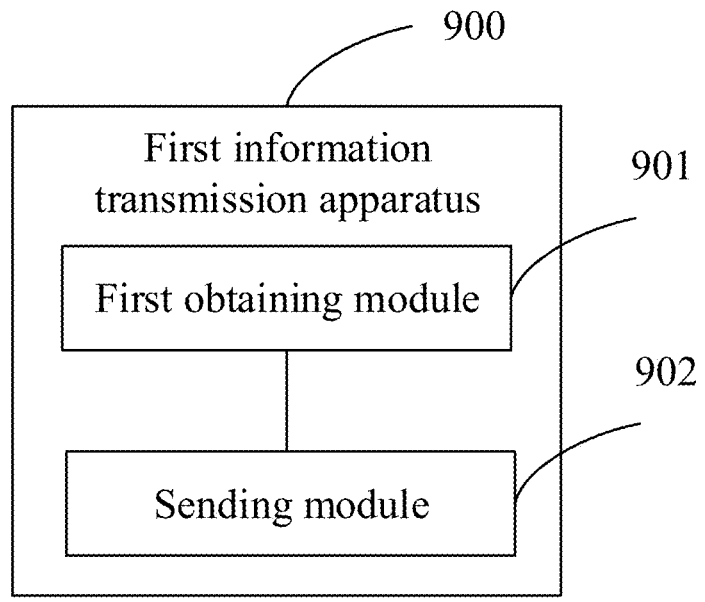
FIG. 9 is a structural diagram of a first information transmission apparatus according to an embodiment of this application.

As shown in FIG. 9, an embodiment of this application provides a first information transmission apparatus 900, including:
a first obtaining module 901, configured to obtain arrival time advance information, where the arrival time advance information includes an arrival time advance of a target picture frame, and the arrival time advance is an advance of an actual arrival time of the target picture frame relative to a target arrival time; and
a sending module 902, configured to send the arrival time advance information to a network-side device.

Further, the actual arrival time includes one of the following:

a time of receiving a last data packet when a terminal receives a data packet included in the target picture frame; and a time of obtaining the target picture frame by the terminal by parsing the data packet included in the target picture frame.

Further, the target arrival time includes one of the following:

a target play time of the target picture frame, where the target play time is an actual or predicted time when the target picture frame is played;

a latest arrival time that does not affect playing of the target picture frame;

a time obtained by forward-shifting, by a first offset time, the latest arrival time that does not affect playing of the target picture frame; and a time obtained by forward-shifting by a second offset time relative to the target play time of the target picture frame.

Further, the arrival time advance includes an arrival time advance of each of an intra-coded I-frame, a forward predicted P-frame, and a bi-directionally predicted B-frame, or an arrival time advance of the target picture frame obtained without distinguishing between an I-frame, a P-frame, and a B-frame, where the target picture frame includes the I-frame, the P-frame, and the B-frame.

Further, the arrival time advance information further includes at least one of the following:

information about a first determining method and first indication information, where the information about the first determining method includes the first determining method and/or an identifier of the first determining method, the first indication information is used to indicate a parameter of the first determining method, and the first determining method is used to determine the actual arrival time of the target picture frame; and information about a second determining method, where the information about the second determining method includes the second determining method and/or an identifier of the second determining method, and the second determining method is used to determine the arrival time advance of the target picture frame.

Further, the target picture frame includes at least one picture frame, and the arrival time advance is determined based on an arrival time advance of each of the at least one picture frame.

Further, the arrival time advance is obtained by reserving a first preset time on a first advance, and the first advance is obtained through calculation based on the arrival time advance of each of the at least one picture frame.

Further, the arrival time advance is an arrival time advance corresponding to a preset percentile in a cumulative distribution function curve, where the cumulative distribution function curve represents cumulative probability distribution of the arrival time advance of each of the plurality of picture frames.

Further, the apparatus 900 further includes:

a receiving module, configured to receive, by using a modem of the terminal, request information sent by the network-side device, where the request information is used to request the terminal to send the arrival time advance information; and a second obtaining module, configured to obtain the arrival time advance information by using an application layer of the terminal.

Further, the terminal further includes an adaptation layer located between the application layer and the modem, and the adaptation layer is configured to convert the request information sent by the modem into a format parsable by the application layer, and/or convert the arrival time advance information sent by the application layer into a format parsable by the modem.

Further, the sending module 902 is further configured to send the arrival time advance information to the network-side device by using a modem of the terminal.

Further, a manner of sending the arrival time advance information includes at least one of the following:

periodic sending, sending based on a trigger condition, and sending based on a request.

Further, the trigger condition includes at least one of the following:

the arrival time advance exceeds a first preset threshold;

the arrival time advance is less than a second preset threshold;

an increment exceeds a third preset threshold, where the increment is an increment of the arrival time advance in comparison with an arrival time advance sent to the network-side device last time;

a decrement exceeds a fourth preset threshold, where the decrement is a decrement of the arrival time advance in comparison with the arrival time advance sent to the network-side device last time;

the arrival time advance is a negative value;

the terminal is handed over to another cell; and after a radio link of the terminal fails, the radio link is successfully restored.

Further, the arrival time advance information further includes at least one of the following:

a processing delay budget of an application layer of the terminal;

a processing delay budget of a modem of the terminal; and an end-to-end processing delay budget determined by the application layer of the terminal based on meeting a service quality requirement.

The first information transmission apparatus 900 in this embodiment of this application may be an electronic device, for example, an electronic device with an operating system, or may be a component in an electronic device, for example, an integrated circuit or a chip. The electronic device may be a terminal, or may be other devices than a terminal. For example, the terminal may include but is not limited to the foregoing illustrated type of the terminal 11. The other devices may be a server, a network attached storage (NAS), and the like. This is not specifically limited in this embodiment of this application.

The first information transmission apparatus 900 provided in this embodiment of this application can implement each process implemented by the method embodiment in FIG. 3, with the same technical effect achieved. To avoid repetition, details are not described herein again.

The information transmission method provided in FIG. 6 in this application may be performed by a second information transmission apparatus 1000. An information transmission method apparatus provided in an embodiment of this application is described by assuming that the information transmission method in this embodiment of this application is performed by the second information transmission apparatus 1000.

Figure 10:
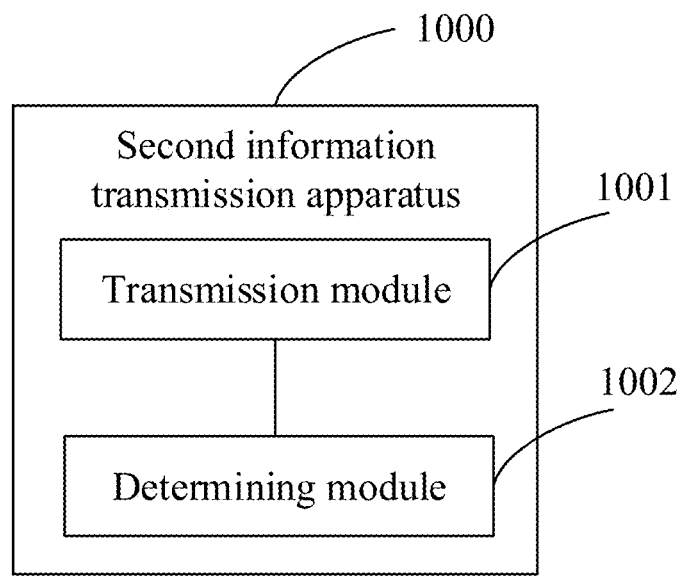
FIG. 10 is a structural diagram of a second information transmission apparatus according to an embodiment of this application.

As shown in FIG. 10, an embodiment of this application provides a second information transmission apparatus 1000, including:

a transmission module 1001, configured to receive arrival time advance information sent by a terminal, where the arrival time advance information includes an arrival time advance of a target picture frame, and the arrival time advance is an advance of an actual arrival time of the target picture frame relative to a target arrival time; and a determining module 1002, configured to determine an air interface transmission delay budget between a first network-side device and the terminal based on the arrival time advance information, where the transmission module 1001 is further configured to transmit the picture frame based on the air interface transmission delay budget.

Further, the actual arrival time includes one of the following:

a time of receiving a last data packet when the terminal receives a data packet included in the target picture frame; and a time of obtaining the target picture frame by the terminal by parsing the data packet included in the target picture frame.

Further, the target arrival time includes one of the following:

a target play time of the target picture frame, where the target play time is an actual or predicted time when the target picture frame is played;

a latest arrival time that does not affect playing of the target picture frame;

a time obtained by forward-shifting, by a first offset time, the latest arrival time that does not affect playing of the target picture frame; and a time obtained by forward-shifting by a second offset time relative to the target play time of the target picture frame.

Further, the arrival time advance includes an arrival time advance of each of an intra-coded I-frame, a forward predicted P-frame, and a bi-directionally predicted B-frame, or an arrival time advance of the target picture frame obtained without distinguishing between an I-frame, a P-frame, and a B-frame, where the target picture frame includes the I-frame, the P-frame, and the B-frame.

Further, the arrival time advance information further includes at least one of the following:

information about a first determining method and first indication information, where the information about the first determining method includes the first determining method and/or an identifier of the first determining method, the first indication information is used to indicate a parameter of the first determining method, and the first determining method is used to determine the actual arrival time of the target picture frame; and information about a second determining method, where the information about the second determining method includes the second determining method and/or an identifier of the second determining method, and the second determining method is used to determine the arrival time advance of the target picture frame.

Further, the transmission module 1001 is further configured to send, to the terminal, request information for requesting the arrival time advance information.

Further, the arrival time advance information further includes at least one of the following:

a processing delay budget of an application layer of the terminal;

a processing delay budget of a modem of the terminal; and an end-to-end processing delay budget determined by the application layer of the terminal based on meeting a service quality requirement.

The second information transmission apparatus 1000 provided in this embodiment of this application can implement each process implemented by the method embodiment in FIG. 6, with the same technical effect achieved. To avoid repetition, details are not described herein again.

Figure 11:
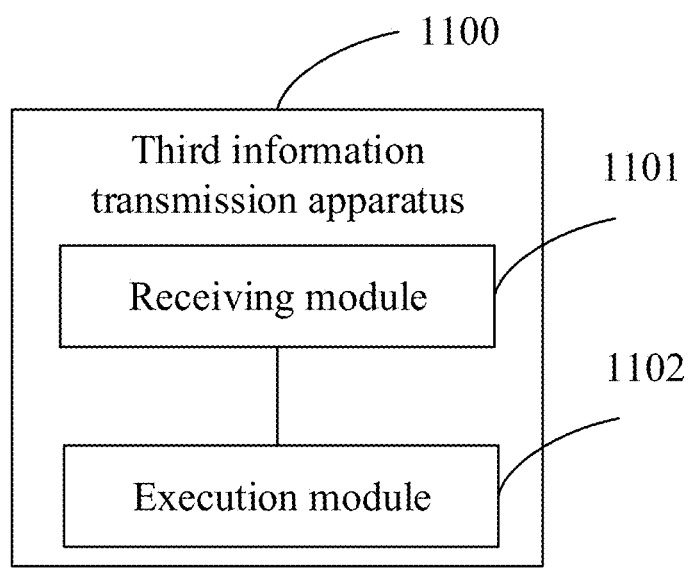
FIG. 11 is a structural diagram of a third information transmission apparatus according to an embodiment of this application.

The information transmission method provided in FIG. 8 in this application may be performed by a third information transmission apparatus 1100. An information transmission method apparatus provided in an embodiment of this application is described by assuming that the information transmission method in this embodiment of this application is performed by the third information transmission apparatus 1100. As shown in FIG. 11, an embodiment of this application provides a third information transmission apparatus 1100, including:

a receiving module 1101, configured to receive arrival time advance information sent by a terminal, where the arrival time advance information includes an arrival time advance of a target picture frame, and the arrival time advance is an advance of an actual arrival time of the target picture frame relative to a target arrival time; and an execution module 1102, configured to perform at least one of the following operations based on the arrival time advance information:

determining an air interface transmission delay budget between a first network-side device and the terminal, and sending the air interface transmission delay budget to the first network-side device; and sending the arrival time advance information to the first network-side device.

Further, the actual arrival time includes one of the following:

a time of receiving a last data packet when the terminal receives a data packet included in the target picture frame; and a time of obtaining the target picture frame by the terminal by parsing the data packet included in the target picture frame.

Further, the target arrival time includes one of the following:

a target play time of the target picture frame, where the target play time is an actual or predicted time when the target picture frame is played;

a latest arrival time that does not affect playing of the target picture frame;

a time obtained by forward-shifting, by a first offset time, the latest arrival time that does not affect playing of the target picture frame; and a time obtained by forward-shifting by a second offset time relative to the target play time of the target picture frame.

Further, the arrival time advance includes an arrival time advance of each of an intra-coded I-frame, a forward predicted P-frame, and a bi-directionally predicted B-frame, or an arrival time advance of the target picture frame obtained without distinguishing between an I-frame, a P-frame, and a B-frame, where the target picture frame includes the I-frame, the P-frame, and the B-frame.

Further, the arrival time advance information further includes at least one of the following:

information about a first determining method and first indication information, where the information about the first determining method includes the first determining method and/or an identifier of the first determining method, the first indication information is used to indicate a parameter of the first determining method, and the first determining method is used to determine the actual arrival time of the target picture frame; and information about a second determining method, where the information about the second determining method includes the second determining method and/or an identifier of the second determining method, and the second determining method is used to determine the arrival time advance of the target picture frame.

Further, the arrival time advance information further includes at least one of the following:

a processing delay budget of an application layer of the terminal;

a processing delay budget of a modem of the terminal; and an end-to-end processing delay budget determined by the application layer of the terminal based on meeting a service quality requirement.

The third information transmission apparatus 1100 provided in this embodiment of this application can implement each process implemented by the method embodiment in FIG. 8, with the same technical effect achieved. To avoid repetition, details are not described herein again.

Figure 12:
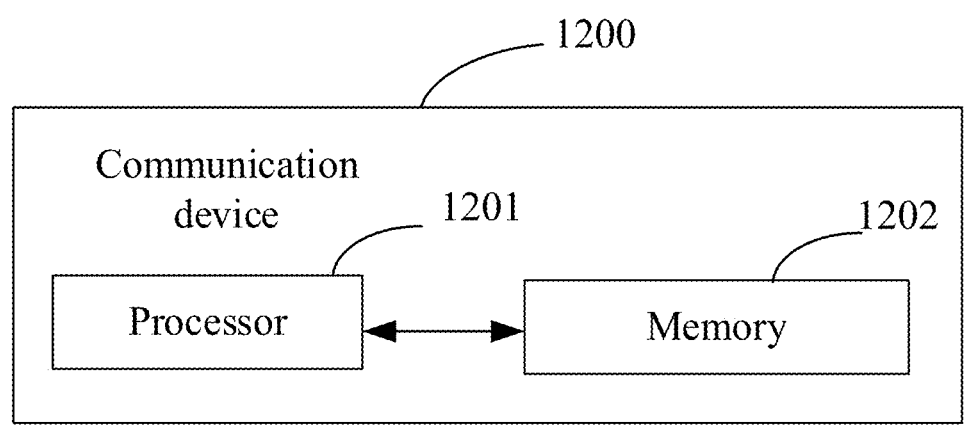
FIG. 12 is a structural diagram of a communication device according to an embodiment of this application.

Optionally, as shown in FIG. 12, an embodiment of this application further provides a communication device 1200, including a processor 1201 and a memory 1202. The memory 1202 stores a program or instructions capable of running on the processor 1201. For example, when the communication device 1200 is a terminal, and the program or instructions are executed by the processor 1201, each step of the foregoing embodiment of the information transmission method shown in FIG. 3 is implemented, with the same technical effect achieved. When the communication device 1200 is a network-side device, and the program or instructions are executed by the processor 1201, each step of the foregoing embodiment of the information transmission method shown in FIG. 6 or FIG. 8 is implemented, with the same technical effect achieved. To avoid repetition, details are not described herein again.

Figure 13:
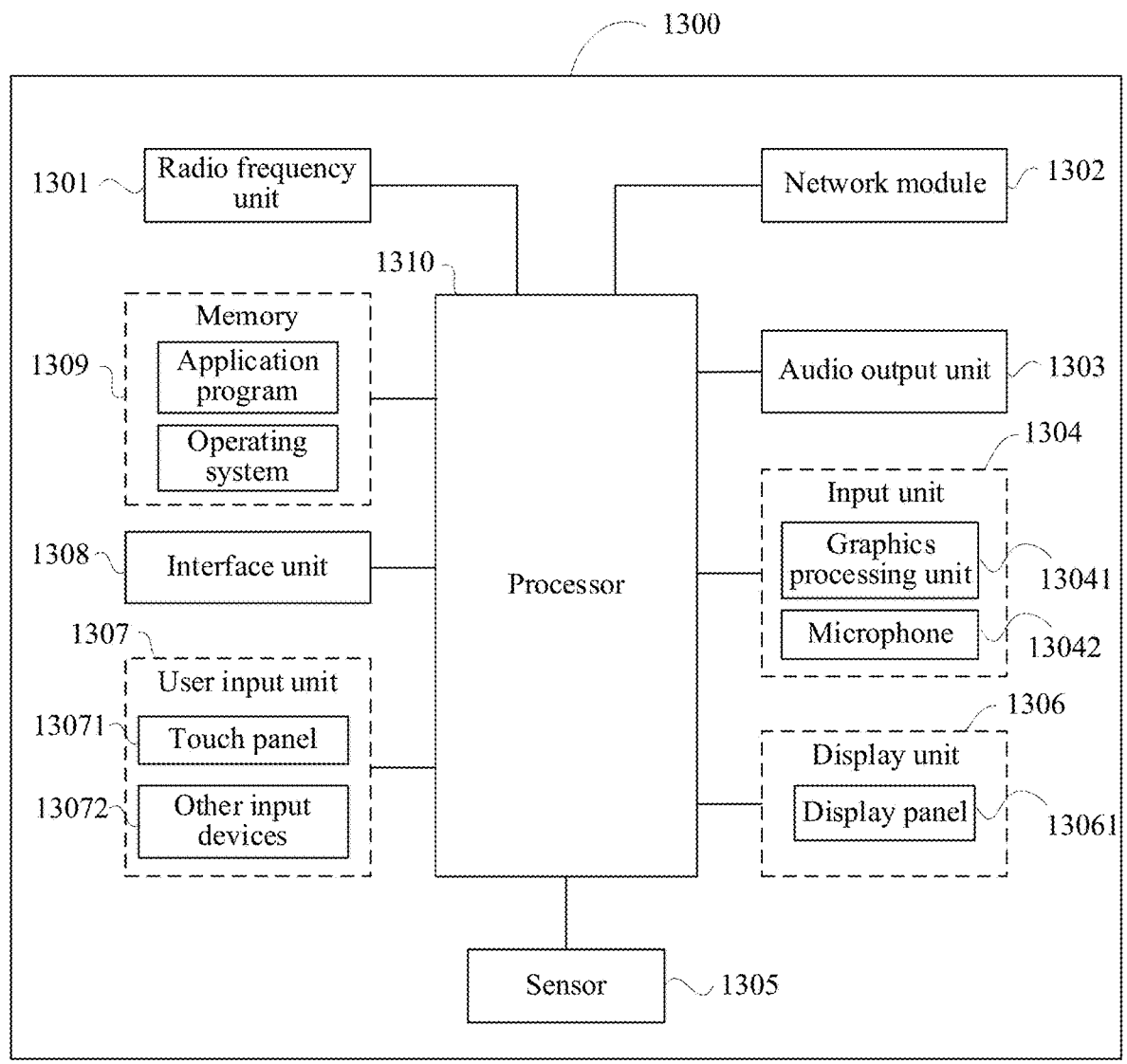
FIG. 13 is a structural diagram of a terminal according to an embodiment of this application.

An embodiment of this application further provides a terminal, including a processor and a communication interface. The processor is configured to obtain arrival time advance information. The communication interface is configured to send the arrival time advance information to a network-side device. The terminal embodiment corresponds to the foregoing terminal-side method embodiment, and each implementation process and implementation of the foregoing method embodiment can be applied to the terminal embodiment, with the same technical effect achieved. Specifically, FIG. 13 is a schematic diagram of a hardware structure of a terminal for implementing an embodiment of this application.

The terminal 1300 includes but is not limited to at least some components such as a radio frequency unit 1301, a network module 1302, an audio output unit 1303, an input unit 1304, a sensor 1305, a display unit 1306, a user input unit 1307, an interface unit 1308, a memory 1309, and a processor 1310.

A person skilled in the art may understand that the terminal 1300 may further include a power supply (for example, a battery) supplying power to all components. The power supply may be logically connected to the processor 1310 through a power management system. In this way, functions such as charge management, discharge management, and power consumption management are implemented by using the power management system. The terminal structure shown in FIG. 13 does not constitute a limitation on the terminal. The terminal may include more or fewer components than those shown in the figure, or some components are combined, or component arrangements are different. Details are not described herein again.

It should be understood that, in this embodiment of this application, the input unit 1304 may include a graphics processing unit (GPU) 13041 and a microphone 13042. The graphics processing unit 13041 processes image data of a still picture or video obtained by an image capture apparatus (such as a camera) in a video capture mode or an image capture mode. The display unit 1306 may include a display panel 13061, and the display panel 13061 may be configured in a form of a liquid crystal display, an organic light-emitting diode, or the like. The user input unit 1307 includes at least one of a touch panel 13071 and other input devices 13072. The touch panel 13071 is also referred to as a touchscreen. The touch panel 13071 may include two parts: a touch detection apparatus and a touch controller. The other input devices 13072 may include but are not limited to a physical keyboard, a function button (such as a volume control button or a power button), a trackball, a mouse, and a joystick. Details are not described herein again.

In this embodiment of this application, after receiving downlink data from a network-side device, the radio frequency unit 1301 may transmit the downlink data to the processor 1310 for processing. In addition, the radio frequency unit 1301 may send uplink data to the network-side device. Usually, the radio frequency unit 1301 includes but is not limited to an antenna, an amplifier, a transceiver, a coupler, a low noise amplifier, a duplexer, and the like.

The memory 1309 may be configured to store software programs or instructions and various data. The memory 1309 may primarily include a first storage area for storing programs or instructions and a second storage area for storing data. The first storage area may store an operating system, an application program or instructions required by at least one function (such as an audio play function and an image play function), and the like. In addition, the memory 1309 may include a volatile memory or a non-volatile memory, or the memory 1309 may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). The memory 1309 in this embodiment of this application includes but is not limited to these and any other suitable types of memories.

The processor 1310 may include one or more processing units. Optionally, the processor 1310 integrates an application processor and a modem processor. The application processor mainly processes operations related to the operating system, a user interface, an application program, and the like. The modem processor mainly processes a wireless communication signal. For example, the modem processor is a baseband processor. It may be understood that the modem processor may alternatively not be integrated in the processor 1310.

The processor 1310 is configured to obtain arrival time advance information, where the arrival time advance information includes an arrival time advance of a target picture frame, and the arrival time advance is an advance of an actual arrival time of the target picture frame relative to a target arrival time.

The radio frequency unit 1301 is configured to send the arrival time advance information to a network-side device.

Further, the actual arrival time includes one of the following:
a time of receiving a last data packet when the terminal receives a data packet included in the target picture frame; and
a time of obtaining the target picture frame by the terminal by parsing the data packet included in the target picture frame.

Further, the target arrival time includes one of the following:
a target play time of the target picture frame, where the target play time is an actual or predicted time when the target picture frame is played;
a latest arrival time that does not affect playing of the target picture frame;
a time obtained by forward-shifting, by a first offset time, the latest arrival time that does not affect playing of the target picture frame; and
a time obtained by forward-shifting by a second offset time relative to the target play time of the target picture frame.

Further, the arrival time advance includes an arrival time advance of each of an intra-coded I-frame, a forward predicted P-frame, and a bi-directionally predicted B-frame, or an arrival time advance of the target picture frame obtained without distinguishing between an I-frame, a P-frame, and a B-frame, where the target picture frame includes the I-frame, the P-frame, and the B-frame.

Further, the arrival time advance information further includes at least one of the following:
information about a first determining method and first indication information, where the information about the first determining method includes the first determining method and/or an identifier of the first determining method, the first indication information is used to indicate a parameter of the first determining method, and the first determining method is used to determine the actual arrival time of the target picture frame; and
information about a second determining method, where the information about the second determining method includes the second determining method and/or an identifier of the second determining method, and the second determining method is used to determine the arrival time advance of the target picture frame.

Further, the target picture frame includes at least one picture frame, and the arrival time advance is determined based on an arrival time advance of each of the at least one picture frame.

Further, the arrival time advance is obtained by reserving a first preset time on a first advance, and the first advance is obtained through calculation based on the arrival time advance of each of the at least one picture frame.

Further, the arrival time advance is an arrival time advance corresponding to a preset percentile in a cumulative distribution function curve, where the cumulative distribution function curve represents cumulative probability distribution of the arrival time advance of each of the plurality of picture frames.

Further, the radio frequency unit 1301 is further configured to control a modem to receive request information sent by the network-side device, where the request information is used to request the terminal to send the arrival time advance information; and the processor 1310 is further configured to control an application layer of the terminal to obtain the arrival time advance information.

Further, the terminal further includes an adaptation layer located between the application layer and the modem, and the adaptation layer is configured to convert the request information sent by the modem into a format parsable by the application layer, and/or convert the arrival time advance information sent by the application layer into a format parsable by the modem.

Further, the radio frequency unit 1301 is further configured to send the arrival time advance information to the network-side device by using a modem of the terminal.

Further, a manner of sending the arrival time advance information includes at least one of the following:
periodic sending, sending based on a trigger condition, and sending based on a request.

Further, the trigger condition includes at least one of the following:
the arrival time advance exceeds a first preset threshold;
the arrival time advance is less than a second preset threshold;
an increment exceeds a third preset threshold, where the increment is an increment of the arrival time advance in comparison with an arrival time advance sent to the network-side device last time;
a decrement exceeds a fourth preset threshold, where the decrement is a decrement of the arrival time advance in comparison with the arrival time advance sent to the network-side device last time;
the arrival time advance is a negative value;
the terminal is handed over to another cell; and
after a radio link of the terminal fails, the radio link is successfully restored.

Further, the arrival time advance information further includes at least one of the following:
a processing delay budget of an application layer of the terminal;
a processing delay budget of a modem of the terminal; and
an end-to-end processing delay budget determined by the application layer of the terminal based on meeting a service quality requirement.

The terminal provided in this embodiment of this application can implement each process implemented by the method embodiment in FIG. 3, with the same technical effect achieved. To avoid repetition, details are not described herein again.

An embodiment of this application further provides a network-side device, including a processor and a communication interface. The communication interface is configured to: receive arrival time advance information sent by a terminal, where the arrival time advance information includes an arrival time advance of a target picture frame, and the arrival time advance is an advance of an actual arrival time of the target picture frame relative to a target arrival time; and transmit the picture frame based on the air interface transmission delay budget; and
the processor is configured to determine an air interface transmission delay budget between the network-side device and the terminal based on the arrival time advance information.

The network-side device embodiment corresponds to the foregoing method embodiment of the network-side device shown in FIG. 6, and each implementation process and implementation of the foregoing method embodiment shown in FIG. 6 can be applied to the network-side device embodiment, with the same technical effect achieved.

An embodiment of this application further provides a network-side device, including a processor and a communication interface. The communication interface is configured to receive arrival time advance information sent by a terminal, where the arrival time advance information includes an arrival time advance of a target picture frame, and the arrival time advance is an advance of an actual arrival time of the target picture frame relative to a target arrival time; and the processor is configured to perform at least one of the following operations:

determining an air interface transmission delay budget between a first network-side device and the terminal, and sending the air interface transmission delay budget to the first network-side device; and sending the arrival time advance information to the first network-side device.

The network-side device embodiment corresponds to the foregoing method embodiment of the network-side device shown in FIG. 8, and each implementation process and implementation of the foregoing method embodiment shown in FIG. 8 can be applied to the network-side device embodiment, with the same technical effect achieved.

Figure 14:
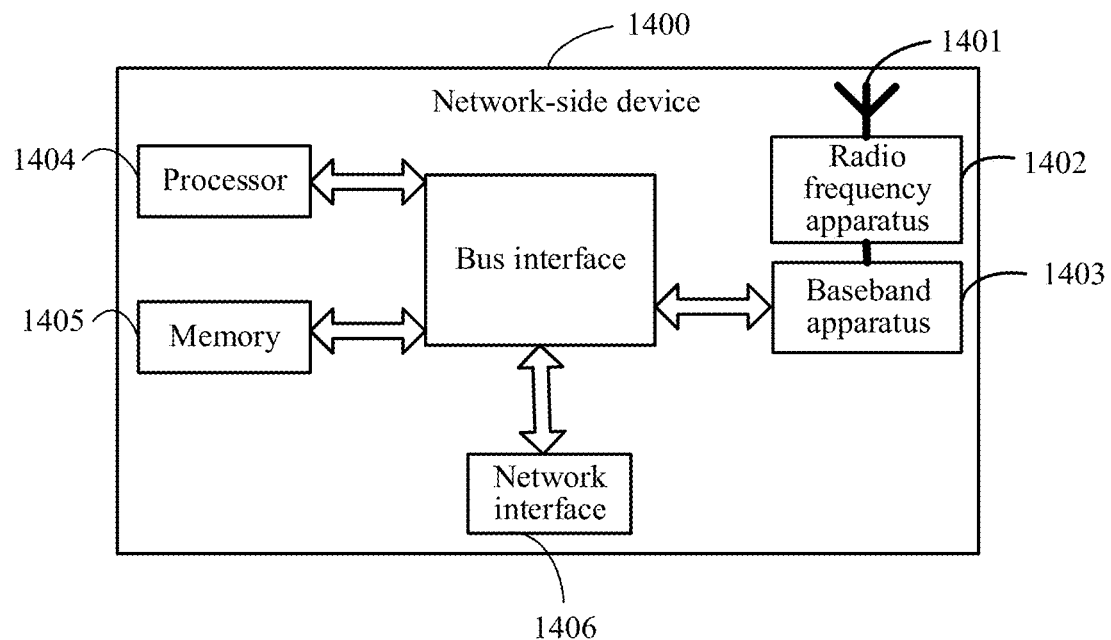
FIG. 14 is a first structural diagram of a network-side device according to an embodiment of this application.

Specifically, an embodiment of this application further provides a network-side device. As shown in FIG. 14, the network-side device 1400 includes an antenna 1401, a radio frequency apparatus 1402, a baseband apparatus 1403, a processor 1404, and a memory 1405. The antenna 1401 is connected to the radio frequency apparatus 1402. In an uplink direction, the radio frequency apparatus 1402 receives information by using the antenna 1401, and sends the received information to the baseband apparatus 1403 for processing. In a downlink direction, the baseband apparatus 1403 processes to-be-sent information, and sends the information to the radio frequency apparatus 1402; and the radio frequency apparatus 1402 processes the received information and then sends the information out by using the antenna 1401.

The method performed by the network-side device in the foregoing embodiment may be implemented in the baseband apparatus 1403. The baseband apparatus 1403 includes a baseband processor.

The baseband apparatus 1403 may include, for example, at least one baseband unit. A plurality of chips are disposed on the baseband unit. As shown in FIG. 14, one of the chips is, for example, the baseband processor, connected to the memory 1405 by using a bus interface, to invoke a program in the memory 1405 to perform operations of the network-side device shown in the foregoing method embodiment.

The network-side device may further include a network interface 1406, where the interface is, for example, a common public radio interface (CPRI).

Specifically, the network-side device 1400 in this embodiment of the present invention further includes a program or instructions stored in the memory 1405 and capable of running on the processor 1404. When the processor 1404 invokes the program or instructions in the memory 1405, the method performed by each module shown in FIG. 10 is performed, with the same technical effect achieved. To avoid repetition, details are not described herein again.

Figure 15:
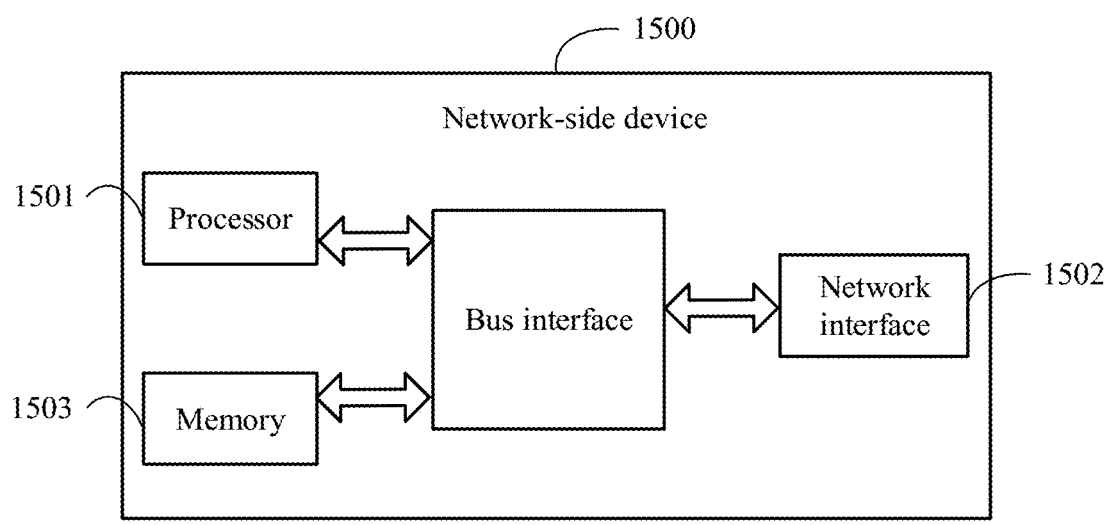
FIG. 15 is a second structural diagram of a network-side device according to an embodiment of this application.

An embodiment of this application further provides a network-side device. As shown in FIG. 15, the network-side device 1500 includes a processor 1501, a network interface 1502, and a memory 1503. The network interface 1502 is, for example, a common public radio interface (CPRI).

Specifically, the network-side device 1500 in this embodiment of the present invention further includes a program or instructions stored in the memory 1503 and capable of running on the processor 1501. When the processor 1501 invokes the program or instructions in the memory 1503, the method performed by each module shown in FIG. 11 is performed, with the same technical effect achieved. To avoid repetition, details are not described herein again.

An embodiment of this application further provides a readable storage medium. The readable storage medium stores a program or instructions. When the program or instructions are executed by a processor, each process of the foregoing embodiment of the information transmission method is implemented, with the same technical effect achieved. To avoid repetition, details are not described herein again.

The processor is a processor in the terminal in the foregoing embodiment. The readable storage medium includes a computer-readable storage medium, such as a computer read-only memory ROM, a random access memory RAM, a magnetic disk, or an optical disc.

In addition, an embodiment of this application provides a chip. The chip includes a processor and a communication interface. The communication interface is coupled to the processor. The processor is configured to run a program or instructions to implement each process of the embodiment of the information transmission method, with the same technical effect achieved. To avoid repetition, details are not described herein again.

It should be understood that the chip provided in this embodiment of this application may also be referred to as a system-level chip, a system chip, a chip system, a system-on-chip, or the like.

In addition, an embodiment of this application provides a computer program product. The computer program product is stored in a storage medium. The computer program product is executed by at least one processor to implement each process of the foregoing embodiment of the information transmission method, with the same technical effect achieved. To avoid repetition, details are not described herein again.

An embodiment of this application further provides a communications system, including a terminal and a network-side device. The terminal may be configured to perform the steps of the foregoing method embodiment shown in FIG. 3. The network-side device may be configured to perform the steps of the foregoing method embodiment shown in FIG. 6 or FIG. 8.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network-side device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

The invention claimed is:

1. An information transmission method, comprising:
    obtaining, by a terminal, arrival time advance information, wherein the arrival time advance information comprises an arrival time advance of a target picture frame, and the arrival time advance is an advance of an actual arrival time of the target picture frame relative to a target arrival time; and
    sending, by the terminal, the arrival time advance information to a network-side device.

2. The method according to claim 1, wherein the actual arrival time comprises one of the following:
    a time of receiving a last data packet when the terminal receives a data packet comprised in the target picture frame; or
    a time of obtaining the target picture frame by the terminal by parsing the data packet comprised in the target picture frame.

3. The method according to claim 1, wherein the target arrival time comprises one of the following:
    a target play time of the target picture frame, wherein the target play time is an actual or predicted time when the target picture frame is played;
    a latest arrival time that does not affect playing of the target picture frame;
    a time obtained by forward-shifting, by a first offset time, the latest arrival time that does not affect playing of the target picture frame; or
    a time obtained by forward-shifting by a second offset time relative to the target play time of the target picture frame.

4. The method according to claim 1, wherein the arrival time advance comprises an arrival time advance of each of an intra-coded I-frame, a forward predicted P-frame, and a bi-directionally predicted B-frame, or an arrival time advance of the target picture frame obtained without distinguishing between an I-frame, a P-frame, and a B-frame, wherein the target picture frame comprises the I-frame, the P-frame, and the B-frame.

5. The method according to claim 1, wherein the arrival time advance information further comprises at least one of the following:
    information about a first determining method and first indication information, wherein the information about the first determining method comprises the first determining method and/or an identifier of the first determining method, the first indication information is used to indicate a parameter of the first determining method, and the first determining method is used to determine the actual arrival time of the target picture frame; or
    information about a second determining method, wherein the information about the second determining method comprises the second determining method and/or an identifier of the second determining method, and the second determining method is used to determine the arrival time advance of the target picture frame.

6. The method according to claim 1, wherein the target picture frame comprises at least one picture frame, and the arrival time advance is determined based on an arrival time advance of each of the at least one picture frame.

7. The method according to claim 6, wherein the arrival time advance is obtained by reserving a first preset time on a first advance, and the first advance is obtained through calculation based on the arrival time advance of each of the at least one picture frame.

8. The method according to claim 6, wherein the arrival time advance is an arrival time advance corresponding to a preset percentile in a cumulative distribution function curve, wherein the cumulative distribution function curve represents cumulative probability distribution of the arrival time advance of each of the at least one picture frame.

9. The method according to claim 1, wherein before the sending, by the terminal, the arrival time advance information to a network-side device, the method further comprises:
    receiving, by a modem of the terminal, request information sent by the network-side device, wherein the request information is used to request the terminal to send the arrival time advance information; and
    obtaining, by an application layer of the terminal, the arrival time advance information.

10. The method according to claim 9, wherein the terminal further comprises an adaptation layer located between the application layer and the modem, and the adaptation layer is configured to convert the request information sent by the modem into a format parsable by the application layer, and/or convert the arrival time advance information sent by the application layer into a format parsable by the modem.

11. The method according to claim 1, wherein the sending, by the terminal, the arrival time advance information to a network-side device comprises:
    sending, by a modem of the terminal, the arrival time advance information to the network-side device.

12. The method according to claim 1, wherein a manner of sending the arrival time advance information comprises at least one of the following:
    periodic sending, sending based on a trigger condition, or sending based on a request.

13. The method according to claim 12, wherein the trigger condition comprises at least one of the following:
    the arrival time advance exceeds a first preset threshold;
    the arrival time advance is less than a second preset threshold;
    an increment exceeds a third preset threshold, wherein the increment is an increment of the arrival time advance in comparison with an arrival time advance sent to the network-side device last time;

a decrement exceeds a fourth preset threshold, wherein the decrement is a decrement of the arrival time advance in comparison with the arrival time advance sent to the network-side device last time;

the arrival time advance is a negative value;

the terminal is handed over to another cell; or after a radio link of the terminal fails, the radio link is successfully restored.

14. The method according to claim 1, wherein the arrival time advance information further comprises at least one of the following:

a processing delay budget of an application layer of the terminal;

a processing delay budget of a modem of the terminal; or an end-to-end processing delay budget determined by the application layer of the terminal based on meeting a service quality requirement.

15. An information transmission method, comprising at least one of the following:

receiving, by a first network-side device, arrival time advance information sent by a terminal, wherein the arrival time advance information comprises an arrival time advance of a target picture frame, and the arrival time advance is an advance of an actual arrival time of the target picture frame relative to a target arrival time;

determining, by the first network-side device, an air interface transmission delay budget between the first network-side device and the terminal based on the arrival time advance information; or transmitting, by the first network-side device, the picture frame based on the air interface transmission delay budget.

16. The method according to claim 15, wherein before the receiving, by a first network-side device, arrival time advance information sent by a terminal, the method further comprises:

sending, by the first network-side device to the terminal, request information for requesting the arrival time advance information.

17. An information transmission method, comprising:

receiving, by a second network-side device, arrival time advance information sent by a terminal, wherein the arrival time advance information comprises an arrival time advance of a target picture frame, and the arrival time advance is an advance of an actual arrival time of the target picture frame relative to a target arrival time; and performing, by the second network-side device, at least one of the following operations based on the arrival time advance information:

determining an air interface transmission delay budget between a first network-side device and the terminal, and sending the air interface transmission delay budget to the first network-side device; or sending the arrival time advance information to the first network-side device.

18. A terminal, comprising a processor and a memory, wherein the memory stores a program or instructions capable of running on the processor, and when the program or instructions are executed by the processor, the steps of the information transmission method according to claim 1 are implemented.

19. A network-side device, comprising a processor and a memory, wherein the memory stores a program or instructions capable of running on the processor, and when the program or instructions are executed by the processor, the steps of the information transmission method according to claim 15 are implemented.

20. A network-side device, comprising a processor and a memory, wherein the memory stores a program or instructions capable of running on the processor, and when the program or instructions are executed by the processor, the steps of the information transmission method according to claim 17 are implemented.

* * * * *